(12) United States Patent
Sakakibara et al.

(10) Patent No.: US 7,206,946 B2
(45) Date of Patent: Apr. 17, 2007

(54) DISK DRIVE SYSTEM FOR STARTING DESTAGING OF UNWRITTEN CACHE MEMORY DATA TO DISK DRIVE UPON DETECTION OF DC VOLTAGE LEVEL FALLING BELOW PREDETERMINED VALUE

(75) Inventors: Yasuhiro Sakakibara, Odawara (JP); Hiroshi Suzuki, Sagamihara (JP); Hiromi Matsushige, Hiratsuka (JP); Masato Ogawa, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/367,594

(22) Filed: Mar. 6, 2006

(65) Prior Publication Data

US 2006/0149979 A1 Jul. 6, 2006

Related U.S. Application Data

(63) Continuation of application No. 10/745,571, filed on Dec. 29, 2003, now Pat. No. 7,100,059.

(30) Foreign Application Priority Data

Oct. 9, 2003 (JP) ............................. 2003-351030

(51) Int. Cl.
*G06F 1/00* (2006.01)
(52) U.S. Cl. ...................... 713/300; 710/100; 711/114; 363/65; 361/687
(58) Field of Classification Search ................ 713/300; 710/100; 711/114; 363/65; 361/687
See application file for complete search history.

(56) References Cited

U.S. PATENT DOCUMENTS 3,432,795 A 3/1969 Jayne .......................... 439/60

(Continued)

FOREIGN PATENT DOCUMENTS

WO 93/23805 11/1993

OTHER PUBLICATIONS

"Transistor Gijutsu Special No. 28," 2nd CQ Publishing Co., Ltd. (Jan. 20, 1993), pp. 4, Figs. 4-6 and p. 7, Fig. 1.

(Continued)

*Primary Examiner*—Thomas Lee
*Assistant Examiner*—Sean Weinman
(74) *Attorney, Agent, or Firm*—Mattingly, Stanger, Malur & Brundidge, P.C.

(57) ABSTRACT

A disk array system including at least one channel control portion, at least one disk control portion, a cache memory, a cache switch, a shared memory, a power unit, and a casing for storing the channel control portion, the disk control portion, the cache memory, the cache switch, the shared memory and the power unit, wherein: each of the channel control portion, the disk control portion, the cache memory, the cache switch and the shared memory includes a control board having a plurality of electronic circuits different in operating voltage, and a voltage converter for converting a single input voltage into voltages for operating the electronic circuits respectively; and the power unit supplies a voltage to the voltage converter provided in each of the channel control portion, the disk control portion, the cache memory, the cache switch and the shared memory.

26 Claims, 15 Drawing Sheets

U.S. PATENT DOCUMENTS

| | | | |
|---|---|---|---|
| 5,325,363 A | 6/1994 | Lui | |
| 5,335,327 A | 8/1994 | Hisano et al. | 711/131 |
| 5,541,787 A | 7/1996 | Jabbari et al. | 360/97.01 |
| 5,583,876 A | 12/1996 | Kakuta | 714/766 |
| 5,636,356 A | 6/1997 | Kakuta et al. | 711/114 |
| 5,675,816 A | 10/1997 | Hiyoshi et al. | |
| 5,768,117 A * | 6/1998 | Takahashi et al. | 363/65 |
| 5,784,641 A | 7/1998 | Takahashi et al. | |
| 5,790,374 A | 8/1998 | Wong | |
| 5,842,030 A | 11/1998 | Larabell et al. | |
| 5,886,424 A | 3/1999 | Kim | |
| 5,915,122 A | 6/1999 | Tsurumi | |
| 6,012,124 A | 1/2000 | Kamo et al. | |
| 6,029,199 A | 2/2000 | Allen et al. | |
| 6,094,725 A | 7/2000 | Hiyoshi et al. | |
| 6,231,224 B1 | 5/2001 | Gamble et al. | |
| 6,272,573 B1 * | 8/2001 | Coale et al. | 710/100 |
| 6,317,839 B1 | 11/2001 | Wells | |
| 6,408,400 B2 | 6/2002 | Taketa et al. | |
| 6,477,619 B1 * | 11/2002 | Fujimoto et al. | 711/114 |
| 6,510,050 B1 | 1/2003 | Lee et al. | |
| 6,520,809 B1 | 2/2003 | Son | 439/679 |
| 6,742,068 B2 | 5/2004 | Gallagher et al. | |
| 6,757,835 B2 | 6/2004 | Kano et al. | |
| 6,795,322 B2 | 9/2004 | Aihara et al. | |
| 6,883,065 B1 | 4/2005 | Pittelkow et al. | 711/114 |
| 2002/0032875 A1 | 3/2002 | Kashani | |
| 2002/0071292 A1 | 6/2002 | Aihara et al. | |
| 2002/0087899 A1 | 7/2002 | Kano et al. | |
| 2002/0144044 A1 | 10/2002 | Moon et al. | 710/302 |
| 2002/0196601 A1 | 12/2002 | Lee et al. | |
| 2003/0041278 A1 | 2/2003 | Lin | |
| 2003/0177404 A1 | 9/2003 | Jorgenson et al. | |
| 2003/0200472 A1 | 10/2003 | Midorikawa et al. | |
| 2003/0217300 A1 | 11/2003 | Fukumori et al. | |
| 2004/0003306 A1 | 1/2004 | Oomori | |
| 2004/0034737 A1 | 2/2004 | Fujimoto et al. | 711/114 |
| 2004/0068670 A1 | 4/2004 | Suzuki et al. | |
| 2004/0078663 A1 | 4/2004 | Inaba | |
| 2004/0088589 A1 | 5/2004 | Westerinen et al. | |
| 2004/0111560 A1 | 6/2004 | Takase et al. | |
| 2004/0143688 A1 | 7/2004 | Sugimoto | |
| 2004/0181699 A1 | 9/2004 | Katoh et al. | |
| 2004/0193791 A1 | 9/2004 | Felton et al. | |
| 2004/0199353 A1 | 10/2004 | Bingham et al. | |
| 2004/0228087 A1 * | 11/2004 | Coglitore | 361/687 |
| 2004/0255174 A1 | 12/2004 | Chen et al. | |
| 2005/0021906 A1 | 1/2005 | Nakamura et al. | 711/113 |
| 2005/0081068 A1 | 4/2005 | Sakakibara et al. | |

OTHER PUBLICATIONS

Caen Engineering Inc, 2001, UE900 11 Half-Height Device Bay Dual Power Supply, 6U Universal Raid Enclosure, pp. 1-2.

* cited by examiner

DISK DRIVE SYSTEM FOR STARTING DESTAGING OF UNWRITTEN CACHE MEMORY DATA TO DISK DRIVE UPON DETECTION OF DC VOLTAGE LEVEL FALLING BELOW PREDETERMINED VALUE

CROSS REFERENCE TO RELATED APPLICATION

The present application is a continuation of application Ser. No. 10/745,571, filed Dec. 29, 2003, now U.S. Pat. No. 7,100,059, and is related to patent applications Ser. No. 10/745,573, filed Dec. 29, 2003, now U.S. Pat. No. 7,069,358, entitled "DISK ARRAY SYSTEM AND DISK DRIVE UNIT" by Y. SAKAKIBARA et al., Ser. No. 10/802,913, filed Mar. 18, 2004, entitled "STORAGE SYSTEM", by H. SUZUKI, et al and Ser. No. 10/463,723, filed Jun. 16, 2003, now U.S. Pat. No. 7,051,216, entitlted "DISK ARRAY DEVICE AND METHOD OF SUPPLYING POWER TO DISK ARRAY DEVICE", claiming foreign priority benefits under 35 U.S.C. Section 119 of Japanese Patent Application No. 2003-351031, the contents of which are incorporated herein by reference.

FIELD OF THE INVENTION

The present invention relates to a disk array system.

BACKGROUND OF THE INVENTION

Increase in scale and complexity of a disk array system has advanced with recent increase in quantity of data used in an information processing system. The number of disk drives mounted in the disk array system has increased with the advance of increase in scale and complexity of the disk array system. Control boards having a plurality of electronic circuits different in operating voltage for controlling reading/writing of data from/in the disk drives are mounted in the disk array system, so that various kinds of power units must be used.

On the other hand, greater reduction in size of the disk array system has been required for effective use of a limited installation space.

Control boards must be mounted densely in such a limited space because of the reduction in size. Therefore, a mechanism for performing maintenance of the disk array system efficiently, such as simplification of wiring for supplying electric power to the control boards, need to be provided in the disk array system.

SUMMARY OF THE INVENTION

The present invention is developed upon such circumstances and a chief object of the present invention is to provide a disk array system.

To achieve the foregoing object, the present invention provides a disk array system including: at least one channel control portion for receiving an input/output request of data from an information processor and exchanging the data with the information processor; at least one disk control portion for exchanging the data with a disk drive in accordance with the input/output request; a cache memory for storing the data exchanged between the channel control portion and the disk control portion; a cache switch for forming a communication path between the channel control portion and the cache memory; a shared memory for storing the input/output request exchanged between the channel control portion and the disk control portion; a power unit; and a casing for storing the channel control portion, the disk control portion, the cache memory, the cache switch, the shared memory and the power unit, wherein: each of the channel control portion, the disk control portion, the cache memory, the cache switch and the shared memory includes a control board having a plurality of electronic circuits different in operating voltage, and a voltage converter for converting a single input voltage into voltages for operating the electronic circuits respectively; and the power unit supplies a voltage to the voltage converter provided in each of the channel control portion, the disk control portion, the cache memory, the cache switch and the shared memory.

The concept "disk drive" means a recording medium-containing device such as a hard disk device or a semiconductor storage device for recording data.

In this configuration, the kinds of power units for supplying electric power to the control boards in the disk array system can be reduced. Accordingly, the installation space of the power unit can be reduced, so that reduction in size of the disk array system can be achieved. Moreover, because the voltage of wiring for supplying electric power to the control boards can be unified, simplification of wiring in the disk array system, facilitation of maintenance and prevention of faulty wiring at the time of assembling the disk array system can be attained. In addition because the kinds of power units can be reduced, the number of parts used in the disk array system can be reduced. Accordingly, both reduction in production cost and facilitation of production can be achieved.

Other objects disclosed in the present invention and means for achieving the objects will become clear from the following best mode for carrying out the present invention and the accompanying drawings.

According to the present invention, there can be provided a disk array system that can fulfill various effects described in the following embodiments.

BRIEF DESCRIPTION OF THE DRAWINGS

Preferred embodiments of the present invention will now be described in conjunction with the accompanying drawings, in which.

DESCRIPTION OF THE EMBODIMENTS

External Appearance of Disk Array System

The visual configuration of a disk array system 100 according to an embodiment of the present invention will be described first with reference to FIG. 1.

Figure 1:
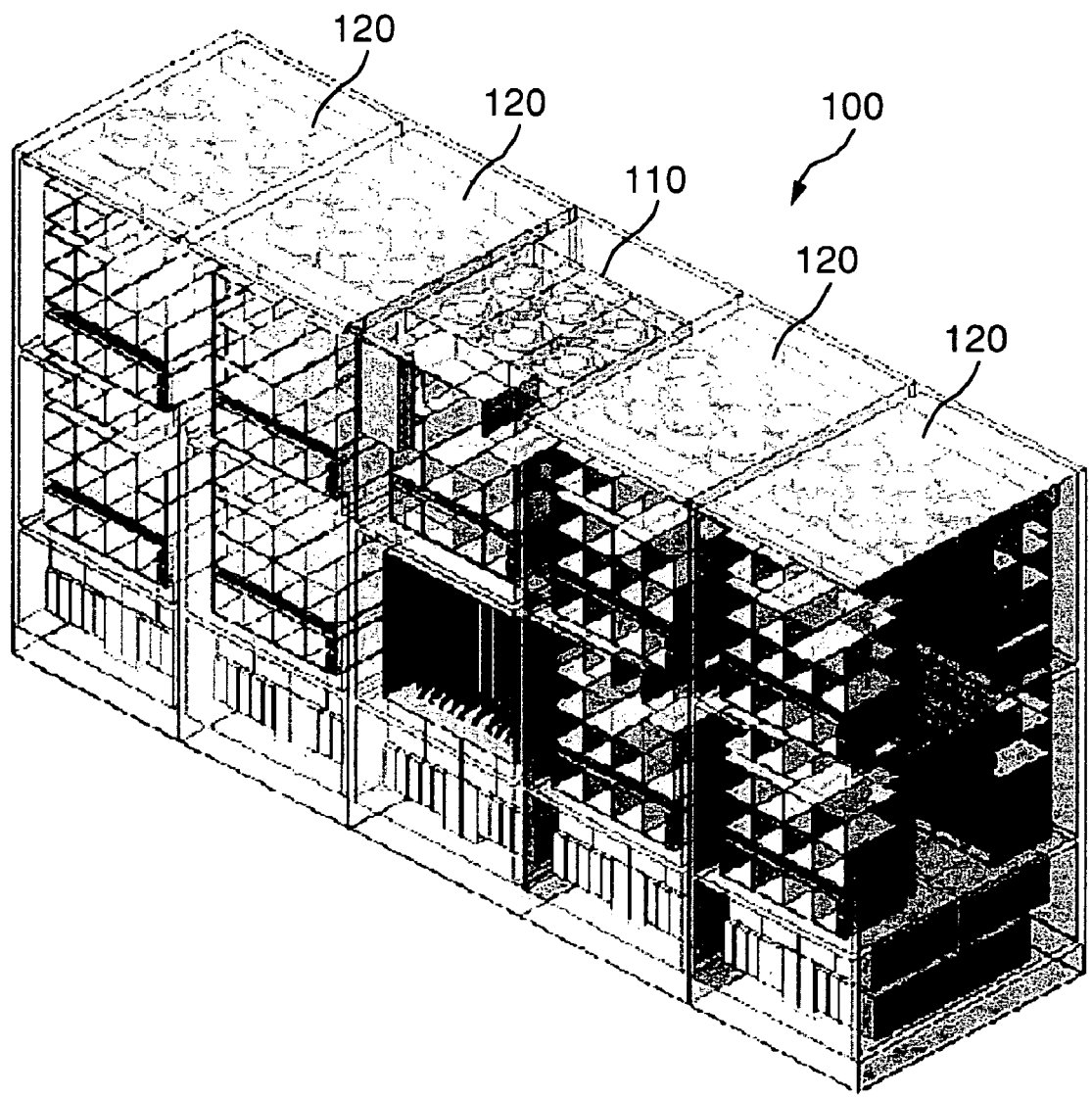
FIG. 1 is a view showing a visual configuration of a disk array system according to an embodiment of the present invention.

The disk array system 100 shown in FIG. 1 includes a control station 110, and drive stations 120. In this embodiment shown in FIG. 1, one control station 110 is disposed in the center and two drive stations 120 are disposed in each of the left and right of the control station 110.

The control station 110 conducts controlling of the disk array system 100 as a whole. As will be described later in detail, logic portions 420 for controlling the disk array system 100 as a whole and disk drive units 310 for storing data are stored in front and rear sides of the control station 110. On the other hand, disk drive units 310 are stored in front and rear sides of each drive station 120.

Various electronic appliances are densely mounted in the disk array system 100 so that reduction in size can be attained while increase in data storage capacity can be achieved. The detailed configurations of the control station 110 and each drive station 120 will be described below with reference to FIGS. 2 to 5.

Figure 2:
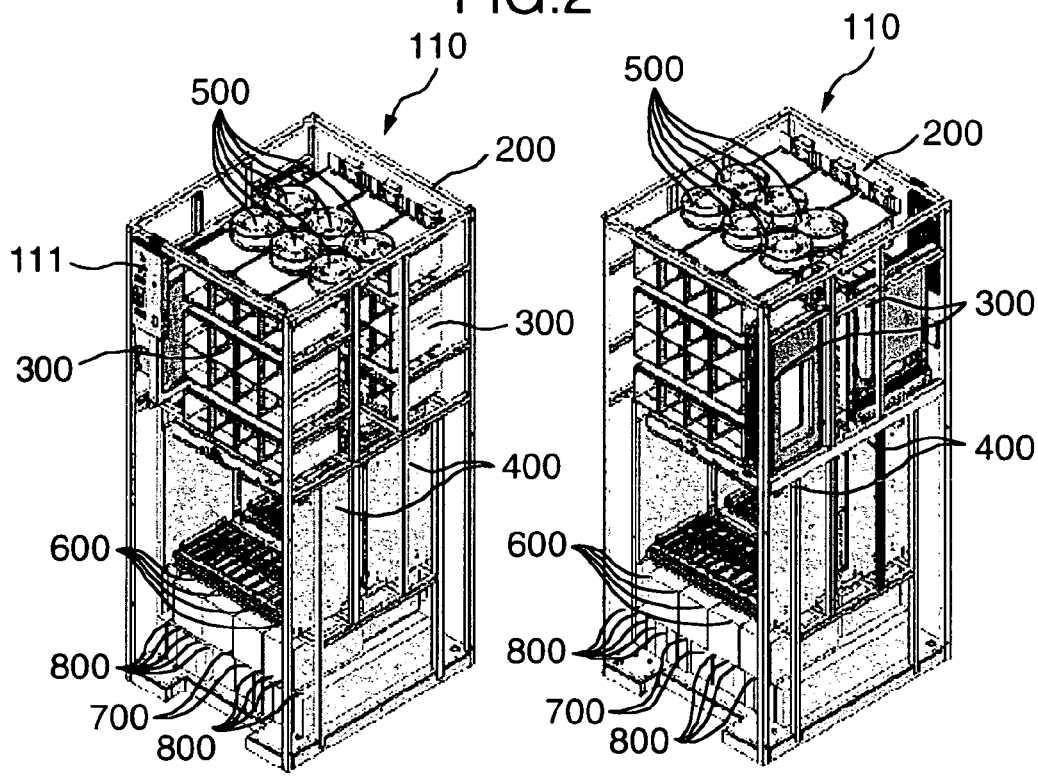
FIG. 2 is a view showing a visual configuration of a control station in this embodiment.
Figure 4:
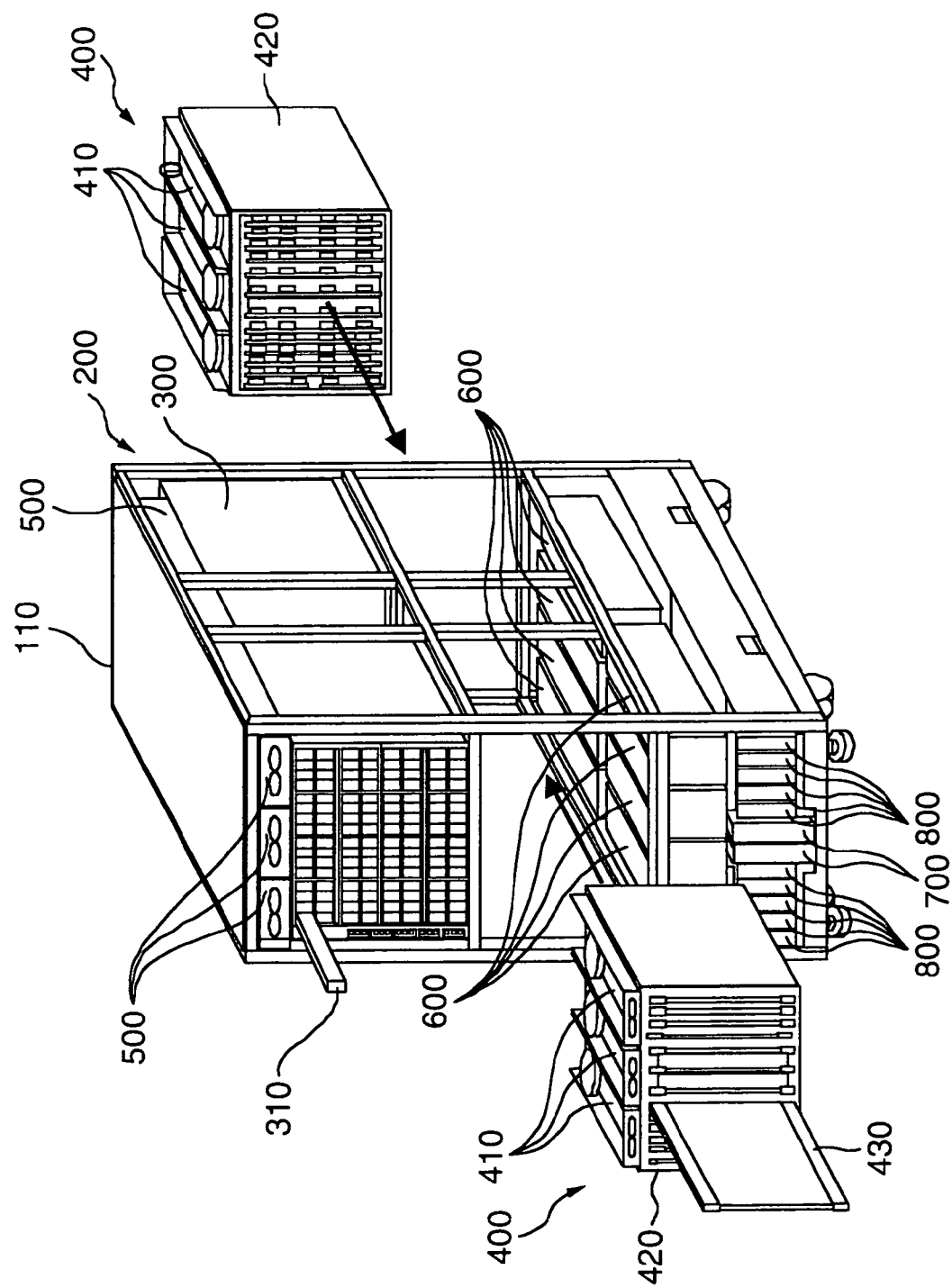
FIG. 4 is a view showing a visual configuration of the control station in this embodiment.

FIGS. 2 and 4 show the configuration of the control station 110. FIG. 2 shows an external appearance of the control station 110 viewed from the rightward oblique front and an external appearance of the control station 110 viewed from the leftward oblique rear. A left half of FIG. 2 shows the external appearance of the control station 110 viewed from the rightward oblique front. A right half of FIG. 2 shows the external appearance of the control station 110 viewed from the leftward oblique rear.

The control station 110 includes disk drive modules 300, logic modules 400, batteries 800, AC boxes 700, AC-DC power supplies 600, fans 500, and an operator panel 111. These disk drive modules 300, these logic modules 400, these batteries 800, these AC boxes 700, these AC-DC power supplies 600, these fans 500, and the operator panel 111 are stored in a casing 200 of the control station 110.

The disk drive modules 300 are stored in an upper stage of the casing 200. A plurality of disk drive units 310 for storing data are disposed in the disk drive modules 300 so as to be adjacent to one another.

Figure 9:
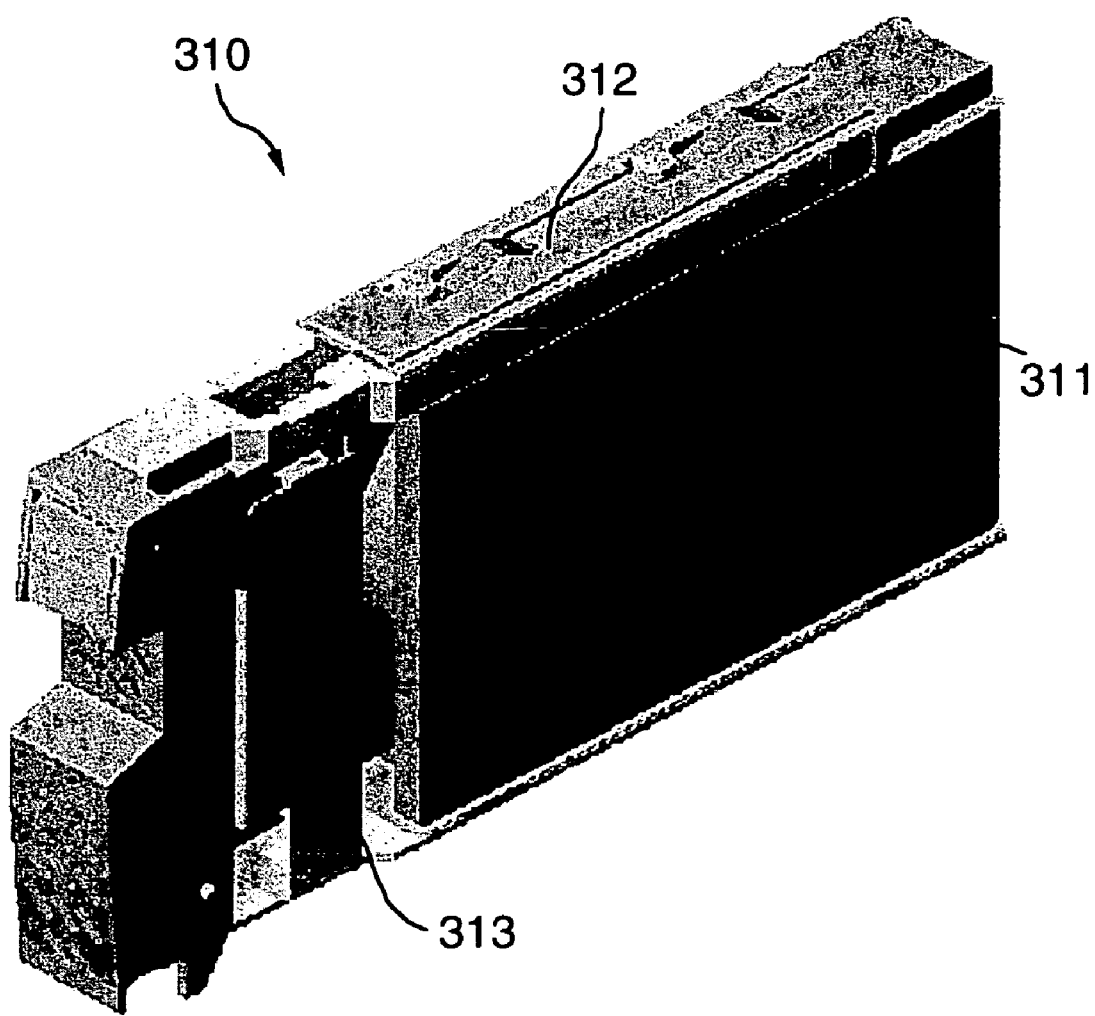
FIG. 9 is a view showing a visual configuration of a disk drive unit in this embodiment.

Each of the disk drive units 310 is provided in such a manner that a recording medium-containing disk drive 311 and a DC-DC converter (a voltage converter for generating a voltage for driving the disk drive 311) 313 are stored in a canister 312. FIG. 9 shows a visual configuration of each disk drive unit 310. In each disk drive unit 310 according to this embodiment, the DC-DC converter 313 is stored in a front side of the canister 312. The DC-DC converter 313 converts DC power with a rated voltage of 56 V (single DC voltage) supplied from the AC-DC power supplies 600 to the disk drive unit 310 into two kinds of DC power with rated voltages of 5 V (voltage for operating the disk drive) and 12 V (voltage for operating the disk drive) and supplies the two kinds of DC power to the disk drive 311. For example, the DC power with a rated voltage of 12 V is supplied to a motor for rotating a disk whereas the DC power with a rated voltage of 5 V is supplied to a control circuit for reading/writing data from/in the disk drive 311.

The logic modules 400 are stored in a middle stage of the casing 200. The logic modules 400 have logic portions 420, and logic module fans 410. The logic portions 420 are provided with control boards 430 having various functions for controlling reading/writing of data from/in the disk drives 311. As will be described later in detail, each of the control boards 430 of the logic portions 420 includes at least any one of a channel adapter (channel control portion for receiving an input/output request of data from an information processor 1000 and exchanging the data with the information processor 1000) 131, a cache memory (cache memory for storing the data exchanged between the channel control portion and a disk control portion) 133, a shared memory (shared memory for storing the input/output request exchanged between the channel control portion and the disk control portion) 135, a cache switch (cache switch for forming a communication path between the channel control portion and the cache memory) 132 and a disk adapter (disk control portion for exchanging the data with a disk drive 311 in accordance with the input/output request) 134. Each control board 430 further includes a plurality of electronic circuits different in operating voltage, and a DC-DC converter for converting a single input voltage of 56 V received from the AC-DC power supplies 600 into voltages for operating the plurality of electronic circuits. The logic module fans 410 are devices for generating cooling air to air-cool the logic portions 420. Cooling air that goes into the casing 200 at the front side of the logical modules 400 through respective gaps between the control boards 430 of the logic portions 420 is sucked in by the logic module fans 410 and the fans 500 and discharged from a ceiling portion of the casing 200 to the outside of the casing 200.

The batteries (storage battery units) 800, the AC boxes 700 and the AC-DC power supplies (power supply devices for supplying a voltage to voltage converters) 600 are stored in a lower stage of the casing 200. The batteries 800, the AC boxes 700 and the AC-DC power supplies 600 are hereinafter generically named "power supply portion".

Each of the AC boxes 700 is an AC power inlet for the disk array system 100 and functions as a breaker. AC power taken in the AC boxes 700 is supplied to the AC-DC power supplies 600.

The AC-DC power supplies 600 are power supply devices for converting a single input AC voltage into DC voltages and outputting the DC voltages to supply DC power to the logic portions 420 and the disk drive units 310. The AC-DC power supplies 600 may be formed so that a single input AC voltage is converted into a single output DC voltage. The logic portions 420 and the disk drive units 310 consume DC power with different rated voltages (voltages for operating the logic portions 420 and the disk drive units 310). For example, in this embodiment, the control boards 430 of the logic 10 portions 420 consume DC power with rated voltages of 5 V, 3.3 V, etc. whereas the disk drive units 310 consume DC power with rated voltages of 5 V and 12 V. Therefore, in this embodiment, the control boards 430 and the disk drive units 310 include DC-DC converters (voltage converters for converting a single input voltage into voltages for operating respective electronic circuits and voltage converters for converting the same voltage as the single input voltage into voltages for operating the disk drives 311) respectively so that the AC-DC power supplies 600 can supply DC power with the same rated voltage to the control boards 430 and the disk drive units 310.

Specifically, each of the AC-DC power supplies 600 converts AC power with a voltage of 200 V into DC power with a rated voltage of 56 V and outputs the DC power. The DC-DC converter provided in each of the control boards 430 and the disk drive units 310 converts the single input voltage of 56 V into the aforementioned voltages. Incidentally, the single input voltage allowed to be input to the DC-DC converter can be selected to be in a range of from 36 V to 60 V. It is a matter of course that the aforementioned values of voltages are shown as an example, and that other values can be selected optionally.

Figure 8:
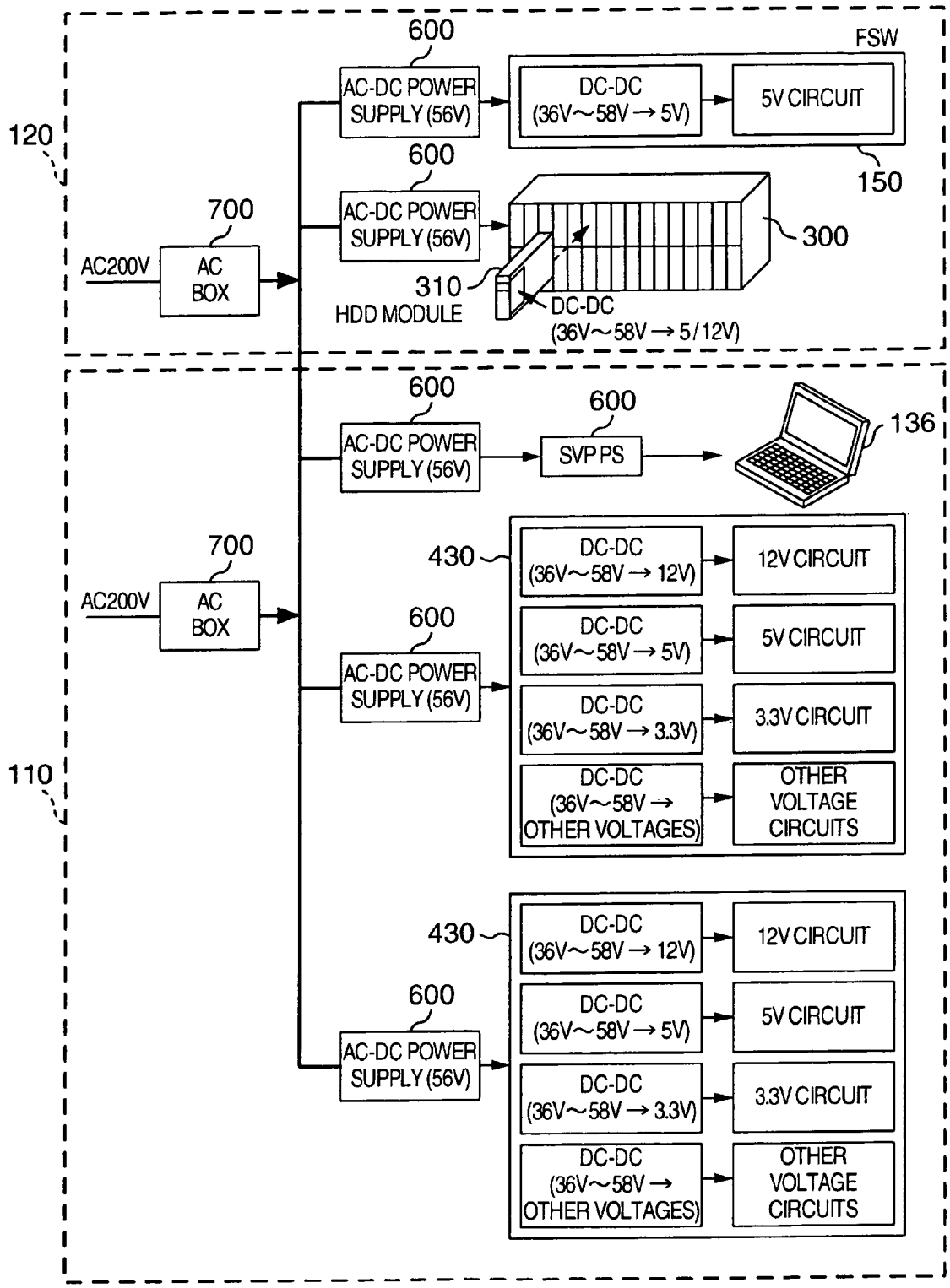
FIG. 8 is a block diagram showing a configuration for supplying electric power to the disk array system according to this embodiment.
Figure 10:
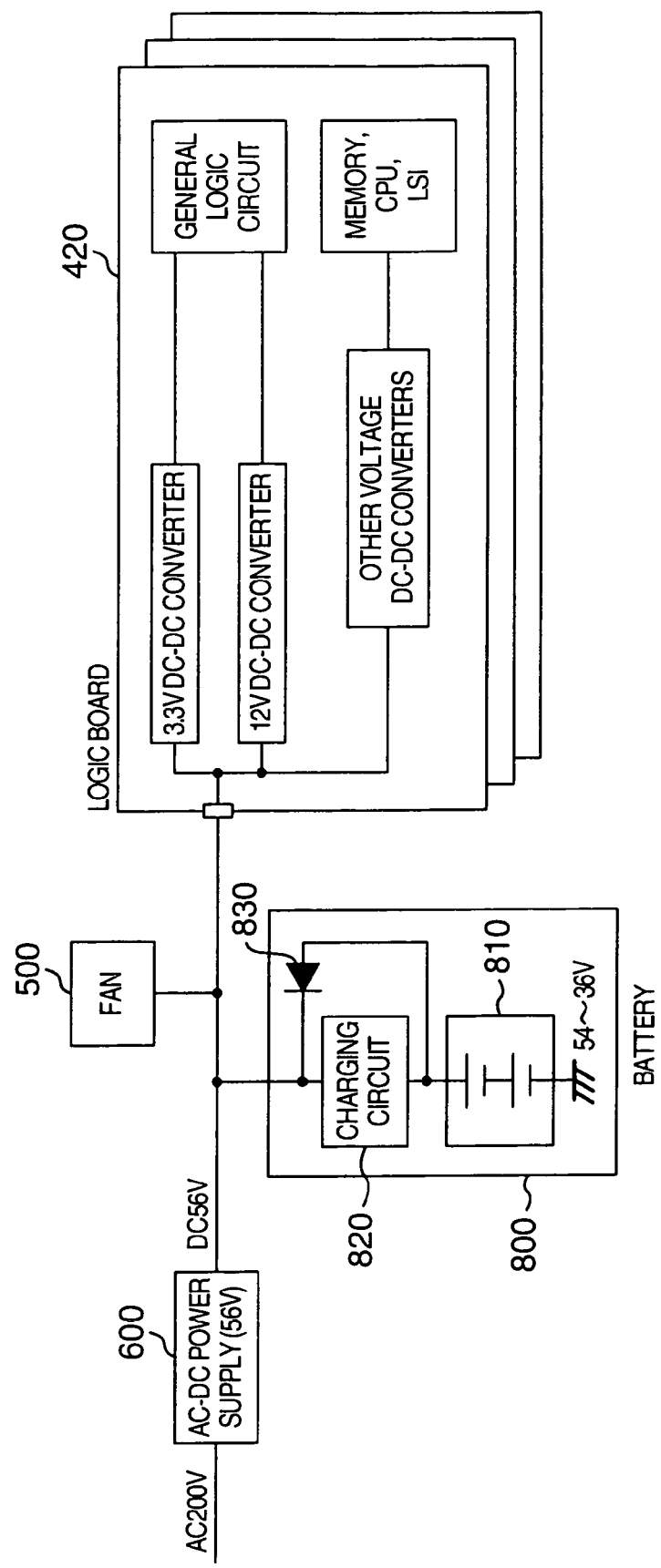
FIG. 10 is a diagram showing a configuration for supplying electric power to each logic board in this embodiment.
Figure 11:
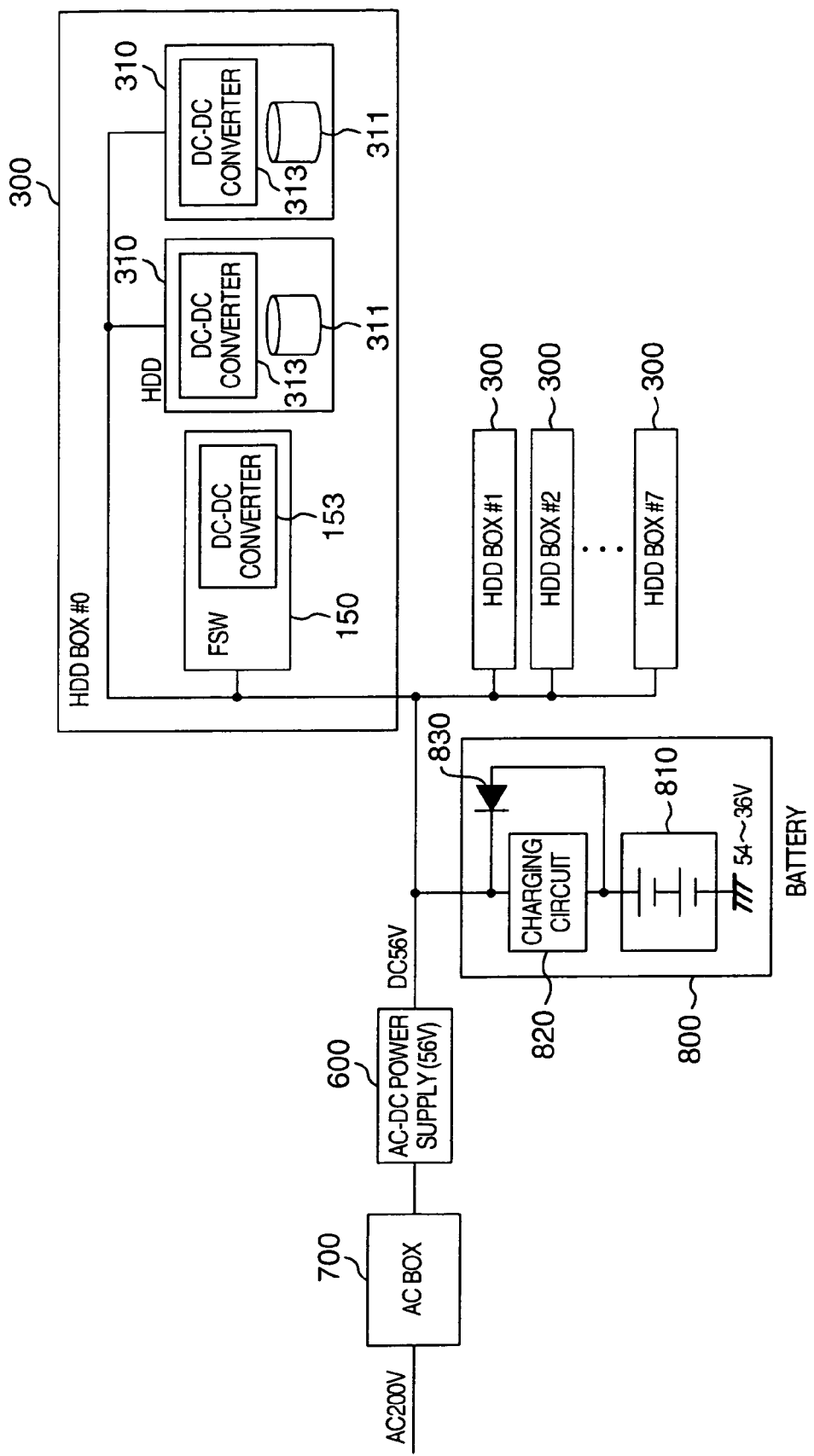
FIG. 11 is a diagram showing a configuration for supplying electric power to each disk drive module in this embodiment.
Figure 12:
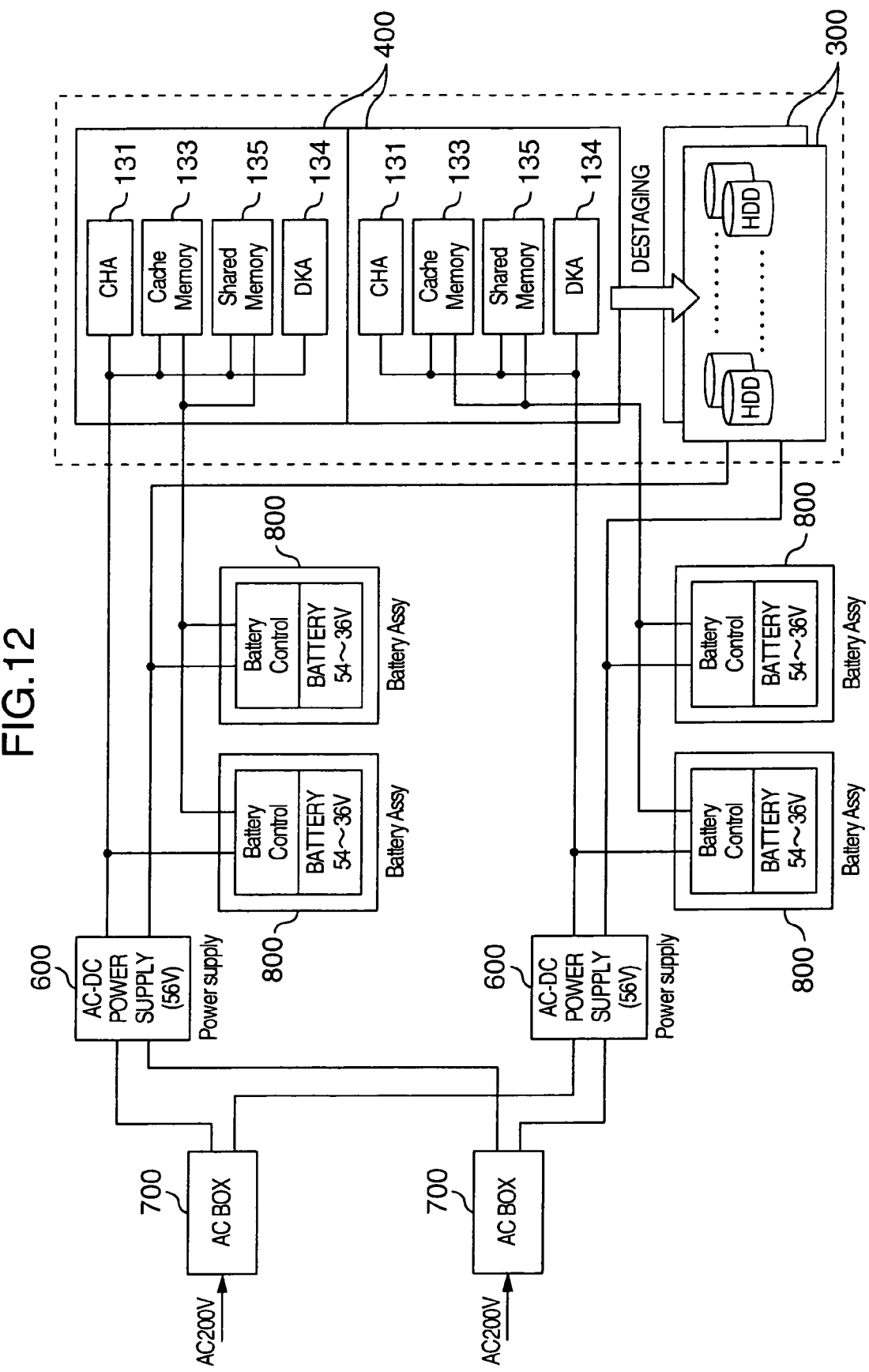
FIG. 12 is a diagram showing a configuration for supplying electric power to the disk array system according to this embodiment.

FIGS. 8, 10 and 11 show a power supply mechanism in the disk array system 100 according to this embodiment. FIG. 10 shows a state in which electric power is supplied to the control boards 430 of the logic portions 420. FIG. 11 shows a state in which electric power is supplied to the disk drive units 310 and fiber channel switches (FSWs) 150 (which will be described later) in the disk drive modules 300.

As shown in FIG. 10, electronic circuits of various rated voltages are formed in the control board 430 of each logic portion 420. Each electronic circuit includes at least one of a CPU (Central Processing Unit), a memory, various kinds of LSIs and other general logic circuits. DC-DC converters for converting a signal DC input voltage of 56 V into output voltages for generating the electronic circuits respectively are formed in the control board 430. Accordingly, the voltage of DC power supplied to the DC-DC converters formed in the control board 430 of each logical portion 420 can be unified into 56 V which is the rated voltage of DC power output from the AC-DC power supplies 600.

As shown in FIG. 11, each disk drive unit 310 or each FSW 150 has a DC-DC converter 313 for converting a single input voltage of 56 V into voltages for operating the disk drive 311 or a DC-DC converter 153 for converting a signal input voltage of 56 V into voltages for operating the FSW 150, similarly to the DC-DC converters formed in the control board 430 of each logic portion 420.

Figure 13:
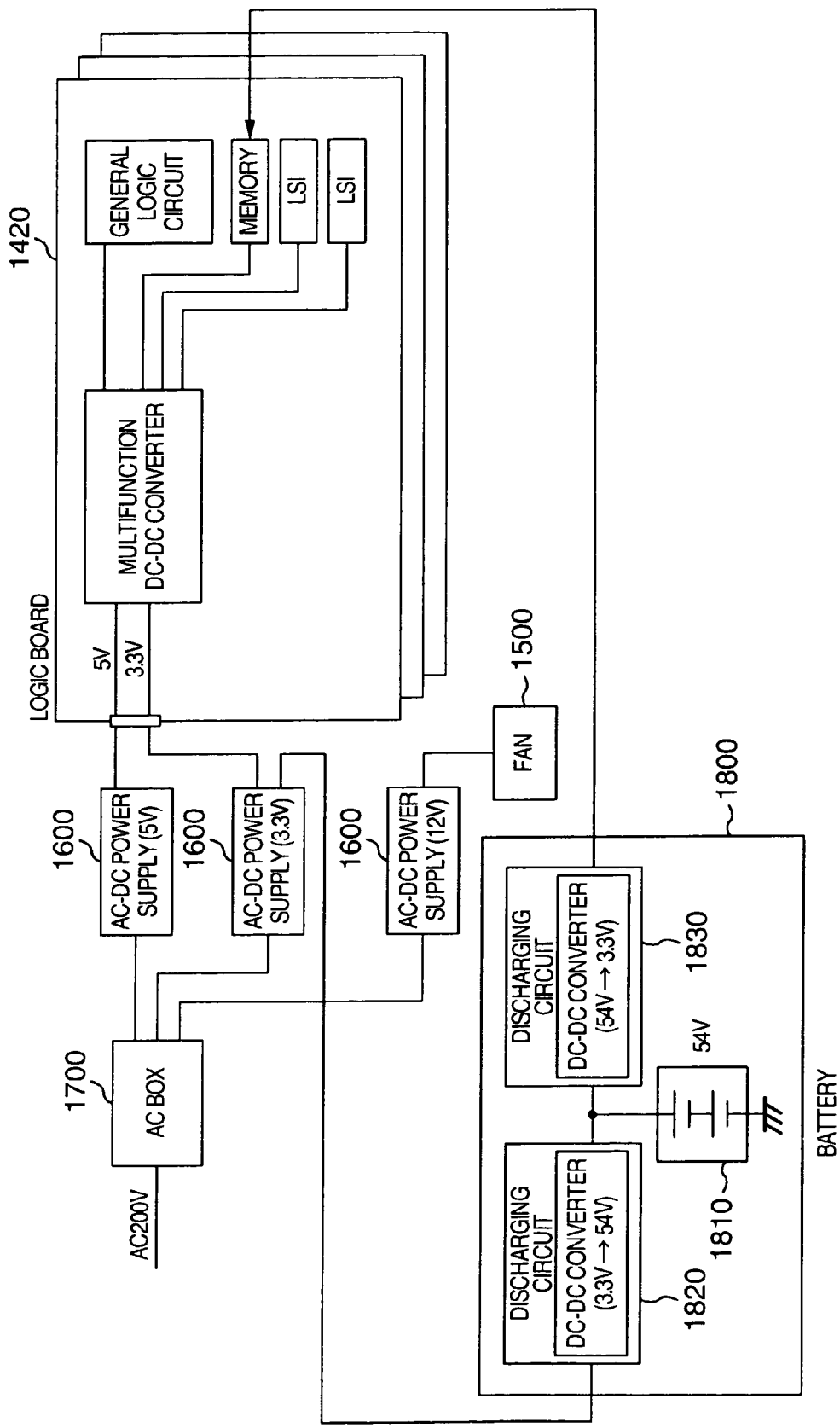
FIG. 13 is a diagram showing a configuration for supplying electric power to each logic board in a disk array system.
Figure 14:
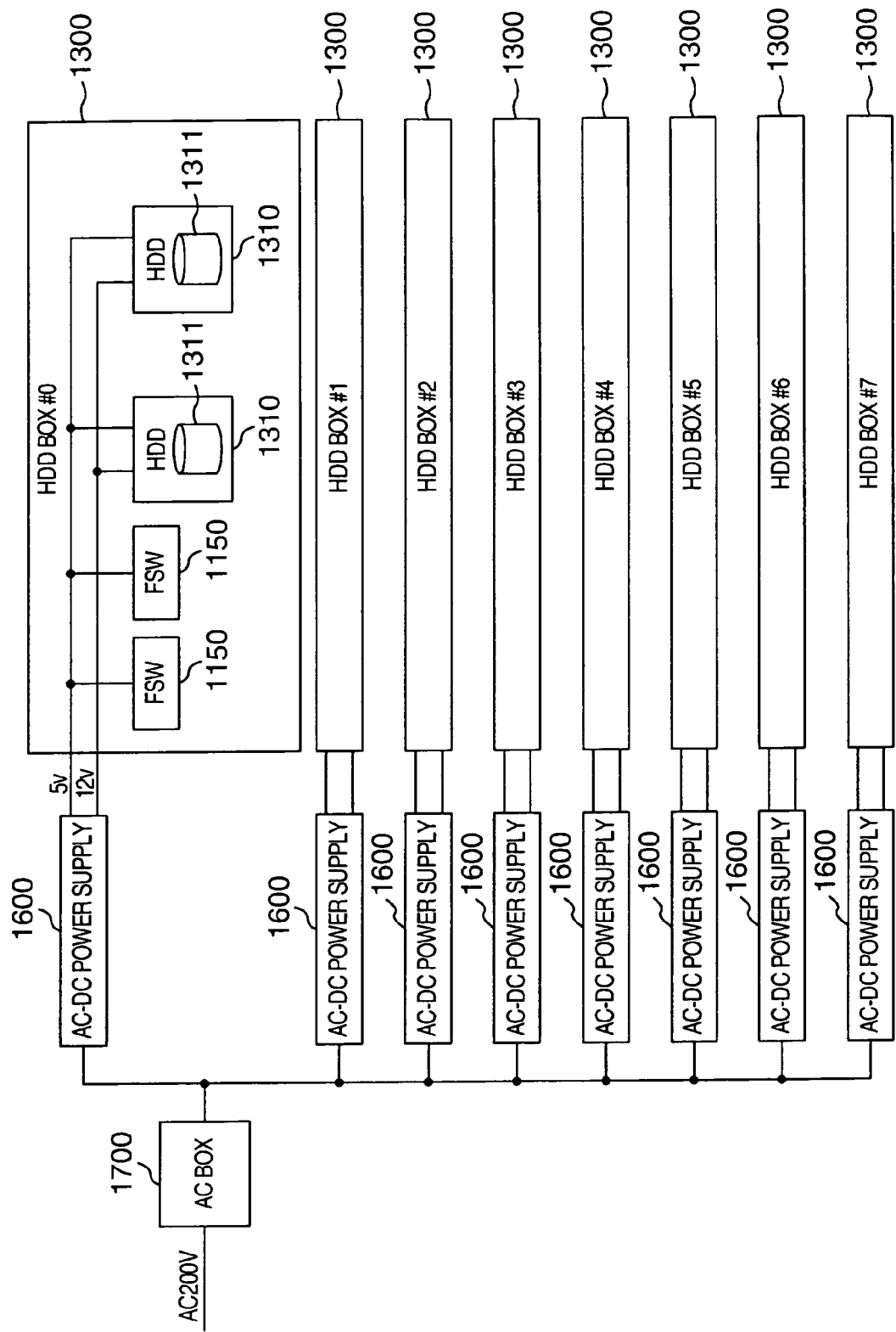
FIG. 14 is a diagram showing a configuration for supplying electric power to each disk drive module in the disk array system.

FIGS. 13 and 14 show another power supply mechanism than the power supply mechanism according to this embodiment. That is, FIGS. 13 and 14 show the case where various kinds of AC-DC power supplies 1600 different in output voltage are provided. The AC-DC power supplies 1600 each converts AC power from an AC Box 1700 into a DC voltage as shown in FIGS. 13 and 14. Specifically, an AC-DC power supply 1600 for outputting a DC voltage of 12 V supplied to fans 1500, an AC-DC power supply 1600 for outputting a DC voltage of 3.3 V supplied to logic boards 1420, an AC-DC power supply 1600 for outputting a DC voltage of 5 V supplied to the logic boards 1420 and AC-DC power supplies 1600 for outputting DC voltages of 12 V and 5 V supplied to disk drive modules 1300 are provided separately.

Within each drive module 1300, the 5V DC voltage is provided, for example, to each FSW 1150 whereas the 12V DC voltage is provided to each disk drive unit 1310 which include at least one disk drive 1311. Incidentally, the DC voltage of 3.3 V is supplied to batteries 1800 via a charging circuit 1820 which charges the battery portion 1800 so that the batteries 1810 can supply a voltage via the discharging circuit 1830 to memories of the logic boards 1420 at the time of power failure or the like. As a result, data stored in the memories can be protected even in the case where power failure or the like occurs. As described above, in the form in which AC-DC power supplies 1600 are provided separately in accordance with output voltages, the installation space of the AC-DC power supplies 1600 in the disk array system becomes so large that the increase in installation space causes a barrier to reduction in size of the disk array system. In addition, cables for respective voltages must be wired complexly in the disk array system.

Referring back to FIGS. 2 and 4, the batteries 800 used in this embodiment are storage battery units that are substituted for the AC-DC power supplies 600 in order to supply voltages to DC-DC converters provided in respective devices, such as disk drives 311 and control boards 430, of the control station 110 when voltage supply from the AC-DC power supplies 600 stops under power failure or under abnormality of the AC/DC power supplies 600.

As shown in FIGS. 10 and 11, the battery assembly 800 used in this embodiment is charged with a voltage of 56 V (voltage the same as the voltage supplied from the AC-DC power supplies 600 to the DC-DC converters) output from the AC-DC power supplies 600. In this manner, because the voltage for charging the battery assembly 800 is set to be equal to the voltage supplied to the DC-DC converters, the kinds of the AC-DC power supplies 600 can be suppressed.

The battery assembly 800 includes an accumulator battery portion 810, a charging circuit 820, and a reverse-current protection device 830. The accumulator battery portion 810 accumulates electric charge. For example, the accumulator battery portion 810 is made of lead batteries. The charging circuit 820 is operated only by a voltage higher than the output voltage of the battery assembly 800, so that the charging circuit 820 converts the 56 V DC power output from the AC-DC power supplies 600 into DC power with 54 V lower than 56 V and charges the accumulator battery portion 810 with the 54 V DC power. In this manner, the battery assembly 800 used in this embodiment is provided so that the accumulator battery portion 810 in the battery assembly 800 is supplied with 54 V lower than 56 V in order to accumulate electric charge while the voltage of 56 V is taken in from the AC-DC power supplies 600. As a result, the size of the accumulator battery portion 810 can be reduced, so that the size of the battery assembly 800 can be reduced. Accordingly, reduction in size of the disk array system 100 can be achieved. The reverse-current protection device 830 allows a current to flow in a direction in which electric charge accumulated in the accumulator battery portion 810 is delivered to the control boards 430 of the logic portions 420, but forbids a current to flow in the reverse direction. For example, the reverse-current protection device 830 is made of a diode. Accordingly, DC power in a range of from 36 V to 54 V can be output from the accumulator battery portion 810 when DC power with 56 V is not output from the AC-DC power supplies 600 under power failure or the like, while the DC power with 56 V output from the AC-DC power supplies 600 can be prevented from being directly applied on the accumulator battery portion 810. As described above, because the single input voltage input to the DC-DC converters provided in the control boards 430, the disk drive units 310 and the FSWs 150 is allowed to be in a range of from 36 V to 60 V, the operations of these electronic appliances can be continued even in the case where the voltage output from the battery assembly 800 is 36 V.

Figure 16:
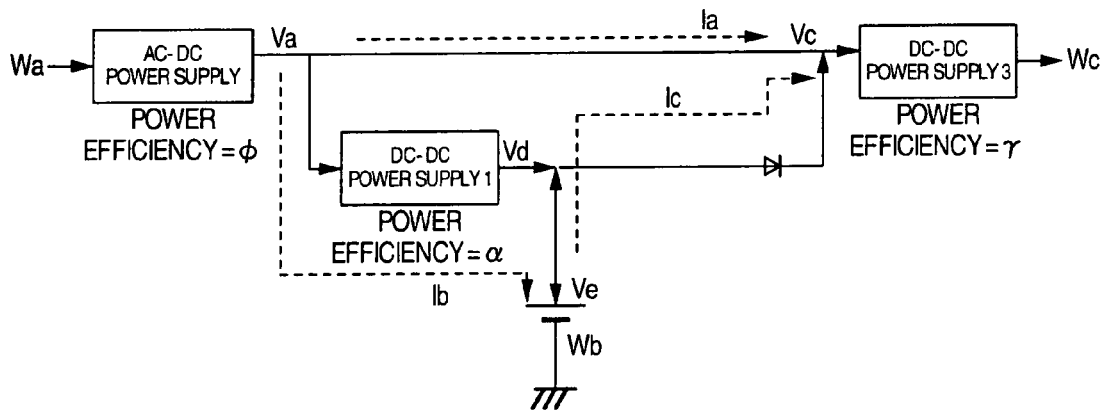
FIG. 16 is a diagram showing a configuration of a charging circuit in the disk array system according to this embodiment.

FIG. 16 shows a charging/discharging circuit of the battery assembly 800 used in this embodiment. In FIG. 16, Wa is an AC voltage of 200 V. Va is a DC voltage of 56 V. Vd is a DC voltage of 54 V. Ve is a DC voltage of 54 V, too. Vc is a DC voltage in a range of from 36 V to 56 V. That is, Vc is 56 V during power supply from the AC-DC power supplies 600 but Vc is in a range of from 36 V to 54 V during power supply from the battery assembly 800 under power failure or the like. Wc expresses various voltages for operating respective electronic appliances mounted in respective modules. For example, Wc expresses various voltages of 3.3 V, 5 V, 12 V, etc. Wb is 0 V.

In FIG. 16, DC-DC power supply 1 is equivalent to the charging circuit 820, and DC-DC power supply 3 is equivalent to a DC-DC converter.

As shown in FIG. 16, some voltage converting processes are carried out while Wa is converted into Wc. A predetermined power loss is produced whenever a voltage converting process is carried out. In the battery charging/discharging circuit used in this embodiment, however, the voltage of 36 V to 54 V output from the accumulator battery portion 810 is not converted into 56 V but directly supplied to the DC-DC converter. Accordingly, as is obvious from comparison with the battery charging circuit shown in FIG. 15, DC-DC power supply 2 can be dispensed with. For this reason, the power loss due to the DC-DC power supply 2 can be avoided. Accordingly, electric power consumed by the disk array system 100 according to this embodiment can be reduced by the power loss (1−β) due to the DC-DC power supply 2. As a result, both reduction in size of the AC-DC power supplies 600 and reduction in storage capacity of the battery assembly 800 can be achieved. As a result, the size of the battery assembly 800 can be reduced, so that the size of the disk array system 100 can be reduced. In addition, the path lowest in power efficiency for charging/discharging the battery assembly 800 is generated only in a period in which the battery assembly 800 is fully charged after power accumulated in the battery assembly 800 is once discharged. During the ordinary operation, Wa is converted into Wc by the path highest in power efficiency. Accordingly, power efficiency is improved.

Because the path of power supply to the control boards 430 of the logic portions 420, the disk drive units 310 and the FSWs 150 can be stabilized, production of noise can be prevented and reliability of the disk array system 100 can be improved. That is, if the output voltage of the battery assembly 800 is 56 V equal to the output voltage of the AC-DC power supplies 600, whether the output power of the AC-DC power supplies 600 (current path=Ia) or the output power of the battery assembly 800 (current path=Ic) is supplied to the logic portions 420 is decided in accordance with the charging and degradation state of the accumulator battery portion 810 and the change in output voltage of the AC-DC power supplies 600. If the power supply path is changed in this manner, noise is produced whenever the power supply path is changed. In this embodiment, however, the output voltage of the battery assembly 800 is set to be lower than the output voltage of the AC-DC power supplies 600 so that the power supply path can be prevented from being changed in the aforementioned manner.

Moreover, in the disk array system 100 according to this embodiment, the disk drive units 310 and the FSWs 150 as well as the control boards 430 of the logic portions 420 are backed up by the battery assembly 800. Accordingly, the operations of the logic portions 420, the disk drive units 310 and the FSWs 150 can be continued even in the case where supply of DC power with 56 V stops under power failure or under abnormality of the AC-DC power supplies 600. Accordingly, even in the case where power failure occurs, reading/writing of data from/in the disk drives 311 can be continued because the operations of the channel adapter 131, the cache memory 133, the cache switch 132, the shared memory 135, the disk adapters 134, the disk drives 311 and the FSWs 150 are continued by power output from the battery assembly 800. When, for example, power supply from the AC-DC power supplies 600 stops and power supply from the battery assembly 800 is carried out, data stored in the cache memory 133 but not written in the disk drives 311 yet can be written in the disk drives 311 (by a destaging process) before power of the battery assembly 800 is spent out. If data can be written in the disk drives 311 by the destaging process before power of the battery assembly 800 is spent out, disappearance of data can be prevented even in the case where power failure occurs for a long time. As a result, reliability of the disk array system 100 can be improved. The destaging process will be described later.

As described above, the accumulator battery portion 810 is charged with a voltage of 54 V. The input voltage of the DC-DC converters provided in the control boards 430, the disk drive units 310 and the FSWs 150 is 60 V at the most. Accordingly, the output voltage of the AC-DC power supplies 600 is preferably selected to be in a range of from 54 V to 60 V. For example, in this embodiment, the output voltage of the AC-DC power supplies 600 is more preferably set at 56 V. When the output voltage of the AC-DC power supplies 600 is selected to be in a range of from 54 V to 60 V as described above, the output voltage of the battery assembly 800 need not be regulated as well as the voltage can be stabilized as described above. As a result, both improvement in power efficiency and stability in voltage can be achieved.

Figure 15:
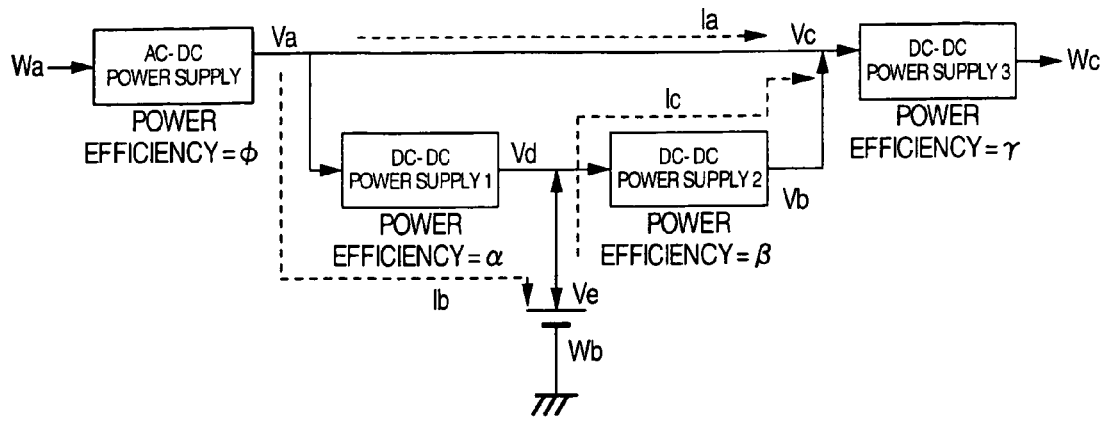
FIG. 15 is a diagram showing a configuration of a charging circuit in the disk array system.

Incidentally, in a battery charging circuit shown in FIG. 15, Wa is an AC voltage of 200 V. Va is a DC voltage of 3.3 V. Vd is a DC voltage of 54 V. Ve is a DC voltage in a range of from 36 V to 54 V. Vc is a DC voltage of 3.3 V. Vb is a DC voltage of 3.3 V, too. Wc expresses voltages for operating respective electronic appliances mounted in respective modules. Wb is 0 V.

Alternatively, the respective voltages are set as follows. Va is a DC voltage of 56 V. Vd is a DC voltage of 54 V. Ve is a DC voltage in a range of from 36 V to 54 V. Vc is a DC voltage in a range of from 36 V to 54 V. Vb is a DC voltage of 36 V. Wc expresses voltages for operating respective electronic appliances mounted in respective modules, and Wb is 0 V, in the same manner as in the above description.

Referring back to FIGS. 2 and 4, the fans 500 are disposed in a ceiling portion of the casing 200. The fans 500 are devices for generating cooling air to air-cool the control station 110. Cooling air that goes into the casing 200 at the front side of the disk drive modules 300 and the logic modules 400 is sucked in the casing 200 by the fans 500 and discharged to the outside of the casing 200.

As described above, in the disk drive unit 310 according to this embodiment, the DC-DC converter 313 is provided on the front side of the canister 312. Accordingly, the cooling air first cools the DC-DC converter 313 in the canister 312. As a result, the DC-DC converter 313 which is one of heat generating sources can be cooled efficiently.

The operator panel 111 is disposed on the front side of the casing 200. The operator panel 111 is a device for accepting operator's entries for maintenance and management of the disk array system 100.

Figure 3:
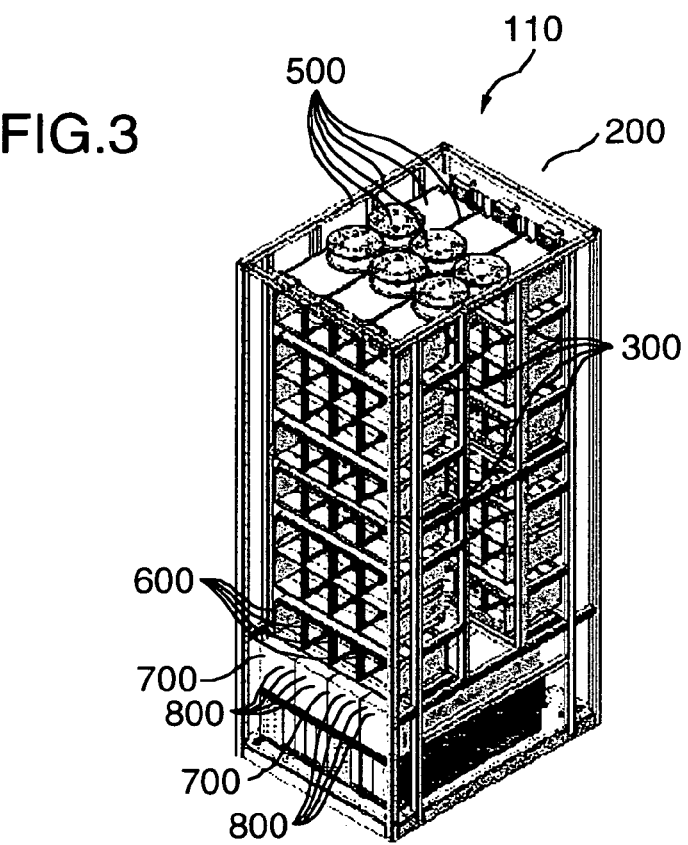
FIG. 3 is a view showing a visual configuration of a drive station in this embodiment.
Figure 5:
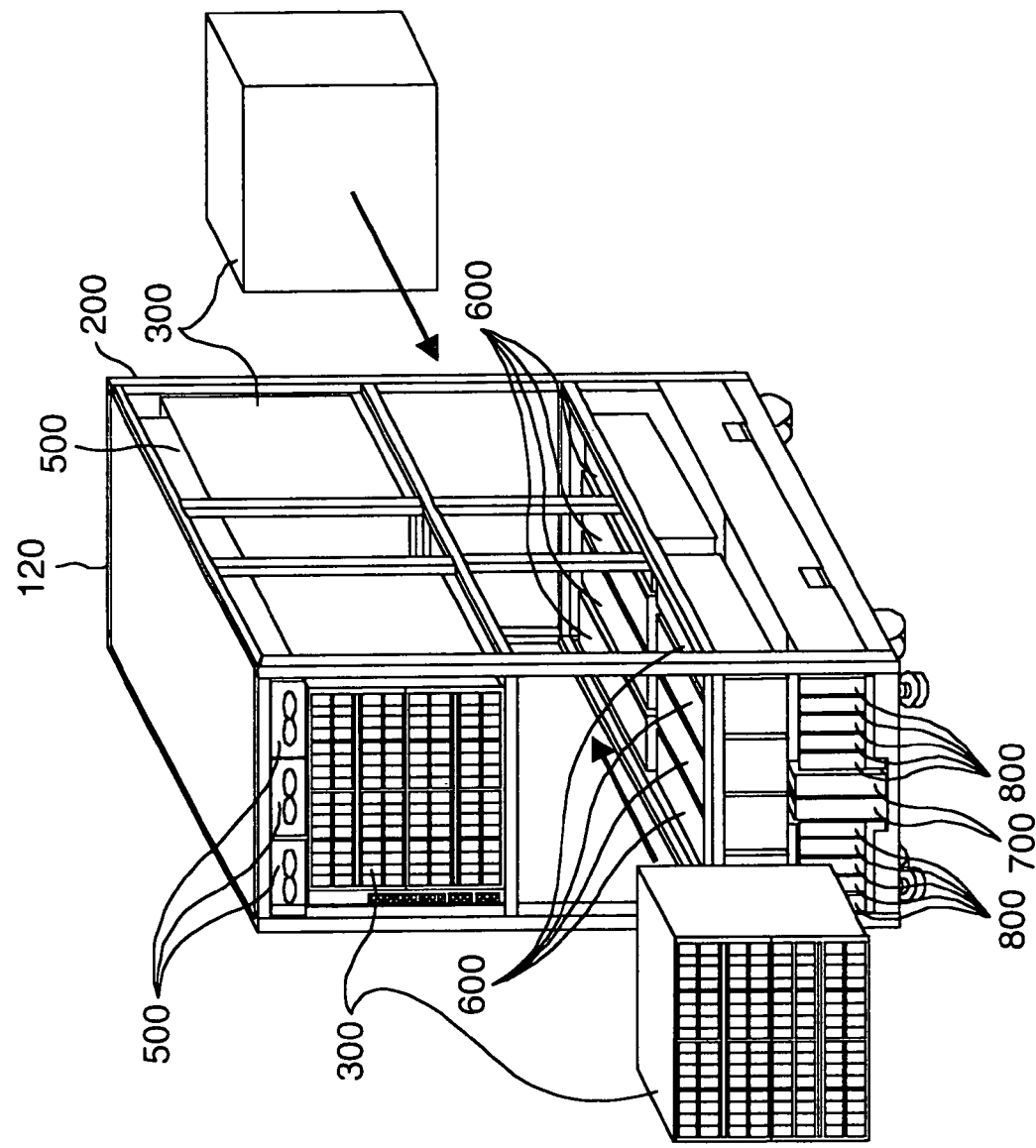
FIG. 5 is a view showing a visual configuration of the drive station in this embodiment.

FIGS. 3 and 5 show the configuration of each drive station 120. FIG. 3 shows an external appearance of the drive station 120 viewed from the rightward oblique front.

Each of the drive stations 120 includes disk drive modules 300, batteries 800, AC boxes 700, AC-DC power supplies 600, and fans 500. The devices included in each drive station 120 are the same as those included in the control station 110.

Incidentally, a casing 200 the same as the casing 200 used in the control station 110 is used in each drive station 120. That is, a control station 110 can be provided when the logic modules 400 are stored in the middle stage of the casing 200, and a drive station 120 can be provided when the disk drive modules 300 are stored in the middle stage of the casing 200.

Configuration of Disk Array System

Figure 6:
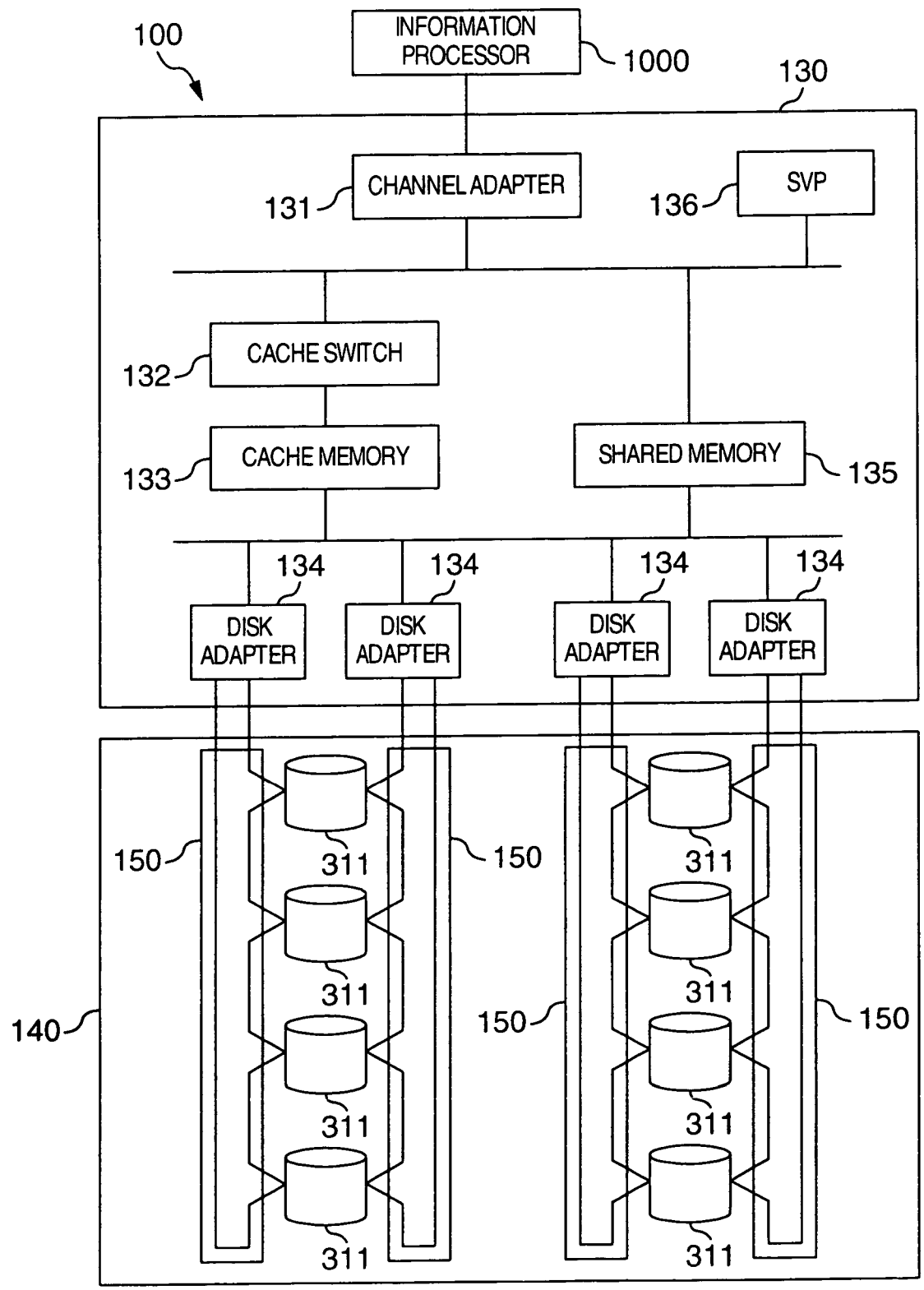
FIG. 6 is a block diagram showing a configuration of the disk array system according to this embodiment.

FIG. 6 is a block diagram showing the configuration of the disk array system 100 according to this embodiment for performing data input/output processing on the basis of a data input/output request (input/output request) given from an information processor 1000. The information processor 1000 is a computer that includes a CPU (Central Processing Unit), and a memory. The CPU included in the information processor 1000 executes various programs to achieve various functions. For example, the information processor 1000 may be used as a key computer in a cash dispensing system of a bank or in an airplane seat reservation system.

In this embodiment, the disk array system 100 includes a disk array control section 130, and a disk array drive section 140. The disk array control section 130 is constituted by the control station 110. The disk array drive section 140 is constituted by the control station 110 and the drive stations 120.

The disk array control section 130 receives a data input/output request from the information processor 1000 and performs data input/output processing for data stored in disk drives 311 included in the disk array drive section 140.

The disk array control section 130 includes a channel adapter 131, a cache memory 133, a cache switch 132, a shared memory 135, disk adapters 134, and a supervisory terminal (referred to as SVP in FIG. 6) 136. The channel adapter 131, the cache memory 133, the cache switch 132, the shared memory 135 and the disk adapters 134 are provided as control boards 430 that form the logic portions 420 shown in FIG. 4, respectively.

The channel adapter 131 has a communication interface for communicating with the information processor 1000. The channel adapter 131 exchanges data input/output requests, data, etc. with the information processor 1000 through the communication interface. Incidentally, the channel adapter 131 may be provided so that it can exchange data input/output requests, etc. with a plurality of information processors 1000. In this case, the disk array control section 130 may include a plurality of channel adapters 131. The channel adapter 131 may be provided so that it can be connected to the information processor 1000 by a network such as SAN (Storage Area Network).

The cache memory 133 and the shared memory 135 are volatile memories for storing data and commands exchanged between the channel adapter 131 and each disk adapter 134. When, for example, the data input/output request received from the information processor 1000 by the channel adapter 131 is a write request, the channel adapter 131 writes the write request in the shared memory 135 and writes data received from the information processor 1000 in the cache memory 133. Then, the disk adapters 134 read the data from the cache memory 133 in accordance with the write request written in the shared memory 135 and write the data in the disk drives 311.

The cache switch 132 is a switch for forming a communication path between the channel adapter 131 and the cache memory 133.

The disk adapters 134 communicate with the disk drives 311 to exchange data with the disk drives 311. For example, the data input/output processing is performed through a communication path that forms a loop (hereinafter referred to as FC-AL loop) defined in fiber channel standard FC-AL. The communication path is formed by use of fiber channel switches (hereinafter referred to as FSWs) 150 provided in the disk array drive section 140. The FSWs 150 will be described later in detail.

The supervisory terminal 136 is a device for maintenance and management of the disk array system 100. For example, the supervisory terminal 136 is a notebook-size collapsible computer included in the control station 110 and having a display unit, and a keyboard unit. It is a matter of course that the supervisory terminal 136 may be provided so as not to be stored in the control station 110. For example, the supervisory terminal 136 may be provided as a remote computer connected by a communication network. Besides the notebook-size computer, a desk top computer may be used as the supervisory terminal 136.

Incidentally, the channel adapter 131, the disk adapters 134, the cache memory 133, the shared memory 135 and the cache switch 132 need not be provided separately. These members 131 to 135 may be integrated into one body or a combination of some members selected from these members 131 to 135 may be integrated into one body.

The channel adapter 131, the disk adapters 134, the cache memory 133, the shared memory 135, the cache switch 132 and the supervisory terminal 136 may be connected to one another by a bus as shown in FIG. 6 or may be connected to one another by a switch or a network.

In this case, an LAN (Local Area Network) may be formed as the network.

Fiber Channel Switch (FSW)

Figure 7:
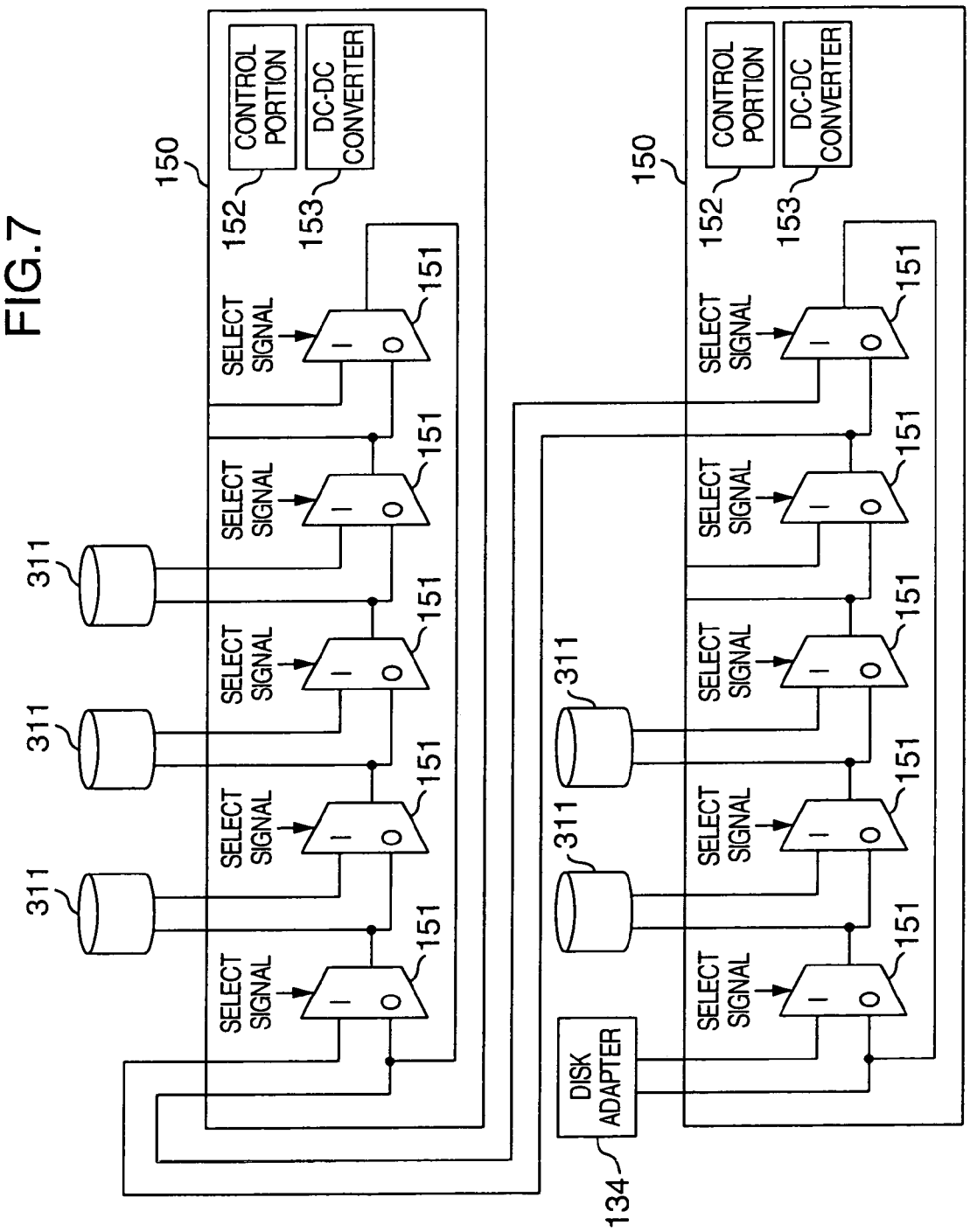
FIG. 7 is a block diagram showing a configuration of fiber channel switches in this embodiment.

FIG. 7 is a diagram showing a state in which a disk adapter 134 is connected to disk drives 311 by a communication path that forms an FC-AL loop.

As shown in FIG. 7, the FC-AL loop can be formed when a disk adapter 134 and disk drives 311 are connected to multiplexers 151 included in FSWs 150. In the example shown in FIG. 7, one FC-AL loop is formed so as to extend over two FSWs 150.

A select signal input to each multiplexer 151 is a signal provided for selecting either "1" input or "0" input of the multiplexer 151. When a disk adapter 134 or a disk drive 311 is connected to a multiplexer 151, a select signal is input to the multiplexer 151 so that the "1" input of the multiplexer 151 is selected. When there is no device connected to a multiplexer 151, a select signal is input to the multiplexer 151 so that the "0" input of the multiplexer 151 is selected. When, for example, failure in a certain disk drive 311 is detected, a select signal is input to a multiplexer 151 connected to the disk drive 311 so that the "0" input of the multiplexer 151 is selected. For example, the select signals input to the multiplexers 151 respectively are controlled by control portions 152.

Each FSW 150 has a control portion 152, and a DC-DC converter 153, as well as the multiplexers 151.

The control portion 152 controls the FSW 150 and controls the DC-DC converters 313 included in the disk drive units 310. For example, controlling the FSW 150 is controlling the select signals input to the multiplexers 151 respectively. When, for example, a certain disk drive 311 is enabled to communicate with the disk adapter 134 or a certain disk drive 311 is disabled from communicating with the disk adapter 134, the select signal for the disk drive 311 is controlled by the control portion 152.

The DC-DC converter 153 converts 56 V DC power of the AC-DC power supply 600, for example, into 5 V DC power to be consumed by the FSW 150.

Feeder Circuit

A feeder circuit for feeding power to the disk array system 100 according to the present invention will be described below with reference to FIG. 8.

The logic portions 420, the disk drive units 310, the supervisory terminal 136 and the FSWs 150 included in the disk array system 100 spend DC power of different rated voltages respectively. In this embodiment, the control boards 430 of the logic portions 420 spend DC power, for example, with rated voltages of 12 V, 5 V and 3.3 V. DC power, for example, with rated voltages of 2.5 V, 1.8 V, 1.5 V, 1.25 V and 1.0 V may be spent as DC power with other voltages. The disk drive units 310 spend DC power, for example, with rated voltages of 12 V and 5 V. The FSWs 150 spend DV power with a rated voltage of 5 V. The reason why DC power with different rated voltages must be spent is that electronic elements and semiconductor elements of various rated voltages are used in electronic circuits that form the control boards 430, the disk drive units 310 and the FSWs 150.

On the other hand, 200 V AC power from the outside is supplied to the disk array system 100 according to this embodiment. The 200 V AC power is input to the AC-DC power supplies 600 via the AC boxes 700. The AC-DC power supplies 600 convert the 200 V AC power into DC power with a rated voltage of 56 V and output the DC power.

DC-DC converters are mounted in the control boards 430 of the logic portions 420, the disk drive units 310 and the FSWs 150 respectively. The DC-DC converters convert DC power with a rated voltage of 56 V output from the AC-DC power supplies 600 into DC power with rated voltages for operating the aforementioned electronic circuits respectively.

In this configuration, even in the case where a plurality of electric circuits different in operating voltage are used in the control boards 430 of the logic portions 420, the disk drive units 310 and the FSWs 150, the voltage of the AC-DC power supplies 600 for outputting power to operate the electronic circuits can be unified into 56 V.

Accordingly, the kinds of the AC-DC power supplies 600 for supplying DC power to the respective electronic circuits in the disk array system 100 can be reduced. In this embodiment, the kinds of the AC-DC power supplies 600 can be unified into a 56 V DC power output type. For this reason, the installation space of the AC-DC power supplies 600 in the disk array system 100 can be reduced, so that reduction in size of the disk array system 100 can be achieved. In addition, because the voltage of wiring for supplying power to the respective electronic circuits in the disk array system 100 can be unified, simplification of wiring in the disk array system 100, facilitation of maintenance and prevention of faulty wiring at assembling the disk array system 100 can be attained.

Even in the case where the disk array system 100 has a plurality of electronic circuits different in operating voltage, the disk array system 100 can be backed up by the batteries 800 of a single voltage type. Moreover, because the installation space of the batteries can be reduced, reduction in size of the disk array system 100 can be achieved.

In addition, because the kinds of the AC-DC power supplies 600 and the kinds of the batteries 800 can be reduced, the number of parts used in the disk array system 100 can be reduced. Accordingly, both reduction in production cost and facilitation of production can be achieved.

Destaging Process

Figure 18:
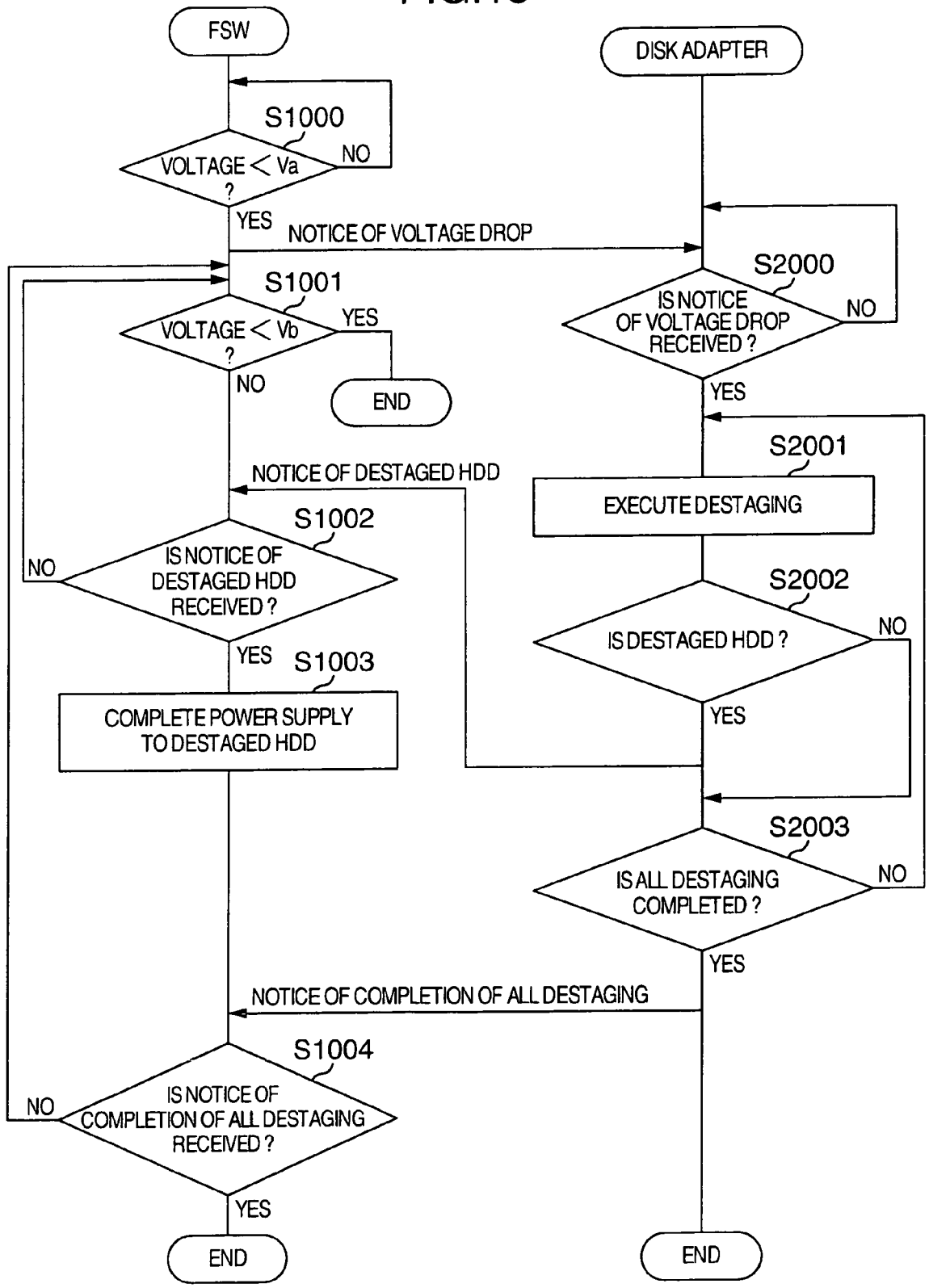
FIG. 18 is a flow chart showing a destaging process in this embodiment.

The aforementioned destaging process will be described below with reference to FIG. 18. FIG. 18 is a flow chart showing the destaging process which is performed by a disk adapter 134 and the control portion 152 of an FSW 150.

Figure 17:
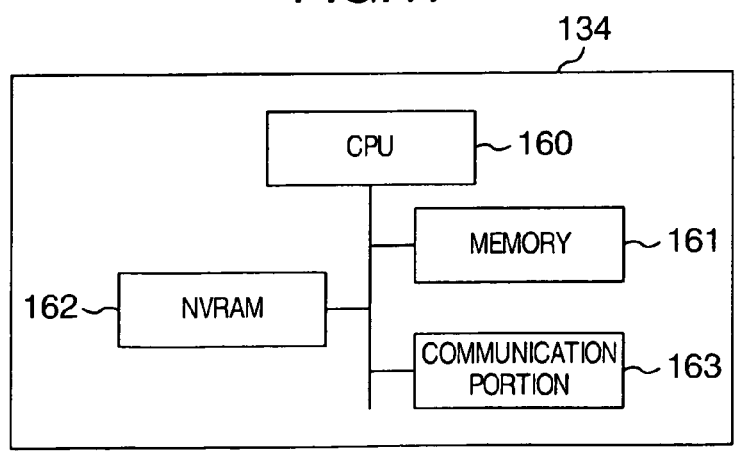
FIG. 17 is a diagram showing a configuration of a disk adapter in this embodiment.

As shown in FIG. 17, the disk adapter 134 has a CPU 160, a memory 161, an NVRAM (Non-Volatile RAM) 162, and a communication portion 163. The CPU 160 conducts controlling of the disk adapter 134. The aforementioned channel adapter 131 performs controlling to exchange data with the disk drives 311 in accordance with the input/output request received from the information processor 1000 and performs controlling for the following destaging process. The memory 161 is a storage area for storing data and programs necessary for the CPU 160 to perform the aforementioned controlling. The NVRAM 162 is a non-volatile storage area for storing programs necessary for the CPU 160 to perform the aforementioned controlling. The communication portion 163 has a communication interface for communicating with the cache memory 133, the shared memory 135, the disk drives 311, the FSW 150, etc.

The destaging process is carried out as follows. The FSW 150 compares the input voltage of the DC-DC converter 153, that is, the output voltage of the AC-DC power supplies 600 with a first reference value Va (S1000). For example, the first reference value Va can be set as the minimum output voltage of the AC-DC power supplies 600. Upon detection of the fact that the input voltage of the DC-DC converter 153 is lower than the first reference value Va, the FSW 150 gives a notice of voltage drop to the disk adapter 134. Incidentally, the notice of voltage drop may be given to the disk adapter 134 when the condition that the input voltage of the DC-DC converter 153 is lower than the first reference value Va continues for a first reference time or longer. In this case, it is possible to discriminate between serious power failure and instantaneous power failure. The term "instantaneous power failure" means a voltage drop for a time too short to exert influence on the operation of the disk array system 100 such as writing of data in the disk drives 311. In this case, reliability of the disk array system 100 can be improved greatly. Incidentally, when the output voltage of the AC-DC power supplies 600 becomes lower than the first reference value Va, the batteries 800 supply power to the DC-DC converter 153.

Then, the FSW 150 compares the input voltage of the DC-DC converter 153, that is, the output voltage of the batteries 800 with a second reference value Vb (S1001). For example, the second reference value Vb can be set as the minimum output voltage of the batteries 800. When the FSW 150 detects the fact that the input voltage of the DC-DC converter 153 is lower than the second reference value Vb, the destaging process is terminated. Incidentally, the destaging process may be terminated when the condition that the input voltage of the DC-DC converter 153 is lower than the second reference value Vb continues for a second reference time or longer.

In this case, the destaging process can be prevented from being terminated by a temporary voltage drop. Accordingly, reliability of the disk array system 100 can be improved greatly.

On the other hand, when the disk adapter 134 receives the notice of voltage drop from the FSW 150 (S2000), the disk adapter 134 starts the destaging process (S2001). Specifically, the disk adapter 134 starts data writing so that data stored in the cache memory 133 but not written in a disk drive 311 yet can be written in the disk drive 311. After completion of data 20 writing in the disk drive 311, the disk adapter 134 sends ID information of the disk drive 311 to the FSW 150 (S2002).

Then, the FSW 150 advances to "YES" in S1002. Then, the FSW 150 stops power supply to the disk drive 311 indicated by the notice (S1003). Specifically, in FIG. 7, a select signal is input to the multiplexer 151 connected to the disk drive 311 so that the "0" input of the multiplexer 151 is selected. As a result, power supply to the disk drive 311 is interrupted.

Because power supply to the disk drive 311 after completion of data writing is interrupted quickly in this manner, power consumed by the disk array system 100 can be reduced. Accordingly, the power supply duration of the batteries 800 can be prolonged or the capacity of the batteries 800 can be minimized.

The disk adapter 134 performs data writing so that all data stored in the cache memory 133 but not written in the disk drive 311 yet can be written in the disk drive 311 (S2003). Then, the disk adapter 134 sends a notice of completion of destaging to the FSW 150 and terminates the destaging process.

Upon reception of the notice of completion of destaging (S1004), the FSW 150 terminates the destaging process.

When the destaging process is carried out in the aforementioned manner, data can be written in the disk drive 311 while power of the batteries 800 can be saved. Even in the case where power failure occurs for a long time, disappearance of data can be prevented. Accordingly, reliability of the disk array system 100 can be improved.

Although the best mode for carrying out the present invention has been described above, the aforementioned embodiment is for promoting a better understanding of the present invention but not for interpreting the present invention restrictively. The present invention may be changed or modified without departing from the gist of the present invention and may include changes or modifications equivalent to the aforementioned embodiment.

It should be further understood by those skilled in the art that although the foregoing description has been made on embodiments of the invention, the invention is not limited thereto and various changes and modifications may be made without departing from the spirit of the invention and the scope of the appended claims.

Contents of Japanese Patent Application Nos. 2003-351031 and 2003-351030 both filed on Oct. 9, 2003 in Japan are incorporated herein by reference.

What is claimed is:

1. A disk array system comprising:
    at least one disk controller including:
    at least one channel control unit for receiving an input/output request of data from an information processor and exchanging said data with said information processor,
    at least one disk control unit for exchanging said data with a disk drive in accordance with said input/output request,
    a cache memory unit for storing said data exchanged between said channel control unit and said disk control unit,
    a plurality of power units for supplying power to each of said at least one disk control unit, and said cache unit,
    a casing for storing said at least one channel control unit, said at least one disk control unit, and said cache memory;
    a plurality of Hard Disk Drive (HDD) boxes each including at least one disk drive controlled by said at least one disk control unit;
    a fibre channel switch, coupled between said at least one disk control unit and said at least one disk drive, for selectively supplying said input/output request to said at least one disk drive, said fibre channel switch including a power unit for supplying power to said fibre channel switch;
    a first Alternating Current/Direct Current (AC/DC) power supply which inputs AC power from an AC power supply and outputs DC power to said HDD boxes and said power units of said at least one disk controller each of which converts the DC power supplied by said AC/DC power supply to an appropriate voltage for each of said at least one disk control unit, said cache memory unit and said shared memory unit of said at least one disk controller;
    a battery unit connected between said first AC/DC power supply unit and said power units for precharging power being supplied to said power unit, and
    wherein said at least one disk control unit and said fibre channel switch perform a destaging process such that all data stored in said cache memory that has not been written in the at least one disk drive is written in the at least one disk drive upon detection that the voltage of the DC power output by the AC/DC power supply falls below a predetermined value, and
    wherein said at least one disk control unit and said fibre channel switch controls to stop supplying DC power to a disk drive, said disk drive having finished the destaging process, on a disk drive by disk drive basis.

2. The disk array system according to claim 1, wherein a control portion of the fibre channel switch compares the voltage of the DC power output by the AC/DC power supply with the predetermined value and if the voltage of the DC power is less than said predetermined value outputs a notice to the at least one disk control unit.

3. The disk array system according to claim 2, wherein the at least one disk control unit upon receipt of the notice from the control portion of the fibre channel switch, starts the destaging process by writing data stored in the cache memory that has not been written into the at least one disk drive into the at least one disk drive and after completion of the data writing in the at least one disk drive, sends a notice to the control portion of the fibre channel switch that the destaging process has been completed.

4. The disk array system according to claim 2, wherein the notice sent by the control portion of the fibre channel switch is sent if the voltage of the DC power from the AC/DC power supply remains less than the predetermined value for a predetermined period of time.

5. The disk array system according to claim 1, wherein when the voltage of the DC power output by the AC/DC power supply falls below the predetermined value, the battery unit supplies DC power to the power units.

6. The disk array system according to claim 5, wherein each of said battery units is charged with the same voltage as the power unit supplied voltage and supplies a voltage to said voltage converters when the voltage supply from said power supply is interrupted.

7. The disk array system according to claim 1, wherein for each of said at least one disk drive, a voltage converter is provided for converting the same voltage as said single input voltage into voltages for operating said at least one disk drive.

8. The disk array system according to claim 1, wherein each of said electronic circuits has at least one of a CPU, a memory and a logic circuit.

9. The disk array system according to claim 1, wherein said voltage converters for generating voltages for operating said electronic circuits respectively convert said single DC voltage output from said power unit into voltages for operating said electronic circuits respectively.

10. The disk array system according to claim 1, wherein said voltage converter for generating voltages for operating said disk drive converts said single DC voltage output from said power unit into voltages for operating said disk drive.

11. The disk array system according to claim 1, wherein each battery unit supplies a voltage lower than the voltage supplied by said power unit to said voltage converters when the voltage supply from said power unit is interrupted, wherein said battery unit includes an accumulator battery portion for accumulating electric charge, and a charging circuit for converting the same voltage as the voltage supplied by said power unit into a voltage lower than the same voltage and charging said accumulator battery portion with said voltage lower than the same voltage.

12. The disk array system according to claim 1, wherein said at least one disk controller further includes:

a shared memory unit for storing said input/output request exchanged between said channel control unit and said disk control unit, wherein said power units supply power to said shared memory unit and said shared memory units and said power units are stored in said casing.

13. A in a disk array system including at least one disk controller having at least one channel control unit for receiving an input/output request of data from an information processor and exchanging said data with said information processor, at least one disk control unit for exchanging said data with a disk drive in accordance with said input/output request, a cache memory unit for storing said data exchanged between said channel control unit and said disk control unit, a plurality of power units for supplying power to each of said at least one disk control unit and said cache unit and a casing for storing said at least one channel control unit, said at least one disk control unit, and said cache memory, a plurality of Hard Disk Drive (HDD) boxes each including at least one disk drive controlled by said at least one disk control unit; a fibre channel switch, coupled between said at least one disk control unit and said at least one disk drive, for selectively supplying said input/output request to said at least one disk drive, said fibre channel switch including a power unit for supplying power to said fibre channel switch; a first Alternating Current/Direct Current (AC/DC) power supply which inputs AC power from an AC power supply and outputs DC power to said HDD boxes and said power units of said first disk controller each of which converts the DC power supplied by said AC/DC power supply to an appropriate voltage for each of said at least one disk control unit, said cache memory unit and said shared memory unit of said first disk controller; and a battery unit connected between said first AC/DC power supply unit and said power units for precharging power being supplied to said power unit, said method comprising the step of:

performing, by said at least one disk control unit and said fibre channel switch, a destaging process such that all data stored in said cache memory that has not been written in the at least one disk drive is written in the at least one disk drive upon, said performing including:

detecting whether the voltage of the DC power output by the AC/DC power supply falls below a predetermined value, and if the voltage of the DC power output by the AC/DC power supply falls below a predetermined value, outputting a notice to start the destaging process.

14. The method according to claim 13, wherein a control portion of the fibre channel switch compares the voltage of the DC power output by the AC/DC power supply with the predetermined value and if the voltage of the DC power is less than said predetermined value outputs a notice to the at least one disk control unit.

15. The method according to claim 14, wherein the at least one disk control unit upon receipt of the notice from the control portion of the fibre channel switch, starts the destaging process by writing data stored in the cache memory that has not been written into the at least one disk drive into the at least one disk drive and after completion of the data writing in the at least one disk drive, sends a notice to the control portion of the fibre channel switch that the destaging process has been completed.

16. The method according to claim 14, wherein the notice sent by the control portion of the fibre channel switch is sent if the voltage of the DC power from the AC/DC power supply remains less than the predetermined value for a predetermined period of time.

17. The method according to claim 13, wherein when the voltage of the DC power output by the AC/DC power supply falls below the predetermined value, the battery unit supplies DC power to the power units.

18. The method according to claim 17, wherein each of said battery units is charged with the same voltage as the power unit supplied voltage and supplies a voltage to said voltage converters when the voltage supply from said power supply is interrupted.

19. The method according to claim 13, wherein for each of said at least one disk drive, a voltage converter is provided for converting the same voltage as said single input voltage into voltages for operating said at least one disk drive.

20. The method according to claim 13, wherein each of said electronic circuits has at least one of a CPU, a memory and a logic circuit.

21. The method according to claim 13, wherein said voltage converters for generating voltages for operating said electronic circuits respectively convert said single DC voltage output from said power unit into voltages for operating said electronic circuits respectively.

22. The method according to claim 13, wherein said voltage converter for generating voltages for operating said disk drive converts said single DC voltage output from said power unit into voltages for operating said disk drive.

23. The method according to claim 13, wherein each battery unit supplies a voltage lower than the voltage supplied by said power unit to said voltage converters when the voltage supply from said power unit is interrupted, wherein said battery unit includes an accumulator battery portion for accumulating electric charge, and a charging circuit for converting the same voltage as the voltage supplied by said power unit into a voltage lower than the same voltage and charging said accumulator battery portion with said voltage lower than the same voltage.

24. The disk array system according to claim 12, wherein each of said at least one channel control unit, said at least one disk control unit, said cache memory unit, said shared memory unit and said fibre channel switch includes a control portion having a plurality of electronic circuits different in operating voltage, and a DC/DC voltage converter for converting a single input voltage from said power unit into voltages for operating said electronic circuits respectively, and wherein each of said power units supplies a voltage to said voltage converter provided in each of said at least one channel control unit, said at least one disk control unit, said cache memory unit, said shared memory unit and said fibre channel switch.

25. The method according to claim 13, wherein said at least one disk controller further includes:

a shared memory unit for storing said input/output request exchanged between said channel control unit and said disk control unit, wherein said power units supply power to said shared memory unit and said shared memory units and said power units are stored in said casing.

26. The method according to claim 25, wherein each of said at least one channel control unit, said at least one disk control unit, said cache memory unit, said shared memory unit and said fibre channel switch includes a control portion having a plurality of electronic circuits different in operating voltage, and a DC/DC voltage converter for converting a single input voltage from said power unit into voltages for operating said electronic circuits respectively, and wherein each of said power units supplies a voltage to said voltage converter provided in each of said at least one channel control unit, said at least one disk control unit, said cache memory unit, said shared memory unit and said fibre channel switch.

* * * * *